(12) United States Patent
Zhang et al.

(10) Patent No.: US 8,175,335 B2
(45) Date of Patent: May 8, 2012

(54) CONTENT ADAPTIVE DETECTION OF IMAGES WITH STAND-OUT OBJECT

(75) Inventors: Ximin Zhang, San Jose, CA (US);
Ming-Chang Liu, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 582 days.

(21) Appl. No.: 12/486,487

(22) Filed: Jun. 17, 2009

(65) Prior Publication Data

US 2010/0321513 A1 Dec. 23, 2010

(51) Int. Cl.
*G06K 9/00* (2006.01)
(52) U.S. Cl. ........................................ 382/103
(58) Field of Classification Search .................. 382/173, 382/175, 190, 199, 203, 206, 220; 358/3.22, 358/3.23; 348/25, 135, 152, 169; 396/153
See application file for complete search history.

(56) References Cited

U.S. PATENT DOCUMENTS

| 5,150,433 | A | | 9/1992 | Daly |
| 5,978,519 | A | * | 11/1999 | Bollman et al. ............... 382/282 |
| 6,519,004 | B1 | * | 2/2003 | Bahl ........................ 348/385.1 |
| 7,057,636 | B1 | * | 6/2006 | Cohen-Solal et al. ...... 348/14.08 |
| 7,268,939 | B1 | * | 9/2007 | McDowell ..................... 359/368 |
| 7,356,182 | B1 | * | 4/2008 | Fleisher et al. ............... 382/171 |
| 7,403,659 | B2 | | 7/2008 | Das et al. |
| 2005/0163380 | A1 | * | 7/2005 | Wang et al. .................... 382/199 |
| 2006/0126944 | A1 | | 6/2006 | Loui et al. |
| 2006/0285764 | A1 | * | 12/2006 | Xu et al. ........................ 382/258 |

OTHER PUBLICATIONS

Chi Zhi-Gang et al., "Image Segmentation Considering Intensity Roughness and color Purity", 2002, pp. 1-7 Journal of Software, vol. 13,No. 5, Department of Electronic Engineering, Hiemji Institute of Technology, Himeji 671-2201, Japan.
Sukhwinder Singh et al."Adaptive threshold-based block classification in medical image compression for teleradiology", Science Direct—Computers in Biology and Medicine, Revised Jul. 23, 2006; accepted Aug. 30, 2006, Available online Oct. 20, 2006, Instrumentation and Signal Processing Lab, Department of Electrical Engineering, Indian Institute of Technology Roorkee, Roorkee 247667, Uttaranchal, India.
Keming Chen, et al., "Change Detection based on Adaptive Markov Random Fields", IEEE, 2008, pp. 1-4, National Laboratory of Pattern Recognition, Institute of Automation, Chinese Academy of Sciences, Beijing, China, 100190, Beijing Institute of Remote Sensing, Beijing, China 100854.

* cited by examiner

*Primary Examiner* — Jason M Repko
*Assistant Examiner* — Shervin Nakhjavan
(74) *Attorney, Agent, or Firm* — Haverstock & Owens LLP

(57) ABSTRACT

Content adaptive detection of images having stand-out objects involves block variance-based detection and determining if an object includes a stand-out object. The images with a stand-out object are further processed to isolate an object of interest. The images without a detected stand-out object are further processed with a transition map-based detection method which includes generating a transition map. If an object portrait is determined from the transition map, then the image is further processed to isolate the object of interest.

39 Claims, 7 Drawing Sheets

CONTENT ADAPTIVE DETECTION OF IMAGES WITH STAND-OUT OBJECT

FIELD OF THE INVENTION

The present invention relates to the field of image processing. More specifically, the present invention relates to content adaptive detection of images with a stand-out object.

BACKGROUND OF THE INVENTION

Images contain a variety of regions of information such as a background and a foreground. In some instances, the foreground includes an object which is distinguishable from the background. Such kinds of images are called object portraits.

For some applications, it is desirable to select only a particular region of an image, and to remove the rest of the image, thereby eliminating excess background to focus attention on the selected region. One application, cropping, enables a user to select a region of an image to retain and then crop out the rest of the image. Some implementations have automated the process of cropping.

SUMMARY OF THE INVENTION

Content adaptive detection of images having stand-out objects involves block variance-based detection and determining if an image includes a stand-out object. The images with a stand-out object are further processed to isolate an object of interest. The images without a detected stand-out object are further processed with a transition map-based detection method which includes generating a transition map. If an object portrait is determined from the transition map, then the image is further processed to isolate the object of interest.

In one aspect, a method implemented on a device comprises processing an input image using a block variance-based detection module, if the input image includes a stand-out object, conducting a block variance-based object of interest isolation and otherwise, implementing a transition map-based detection comprising generating a transition map based on a block difference between each block with neighboring blocks, determining if an object portrait is detected based on the transition map, if the object portrait is detected, then conducting the transition map-based object of interest isolation and if the object portrait is not detected, then the input image does not contain an object of interest. Processing the input image includes selecting visually stand-out blocks by comparing each block's variance with a content adaptive threshold and if a distribution compactness of the visually stand-out blocks is compact, the image includes the stand-out object. The method further comprises searching to find a qualified start point to start a center around growing; if the qualified start point is not found, then the transition map-based detection module returns negative; otherwise, if a growing result is successful, the object portrait is detected. The block variance-based detection module is configured for implementing an adaptive block variance extraction method to calculate an adaptive 8×8 block variance for each block, if the obtained variance is larger than a threshold, the variance is kept; otherwise, the block is shifted, and a new, shifted block variance is calculated, if the variance of the shifted block is larger than the threshold, the shifted block variance is used as a current block variance; otherwise, the original block variance is used, after the block variances are obtained, a mean block variance value of high variance blocks is calculated, if the mean variance is larger than a second threshold, the mean value is set to the second threshold, and if the block variance is larger than the mean value, the block is selected as a high variance block and the high variance blocks are analyzed if their distribution is able to satisfy a stand-out criterion check. The method further comprises using a distraction removal module configured for extracting a location centroid of the high variance blocks, counting a number of the high variance blocks in a left ¼ width image and a right ¼ width image, if any of the high variance blocks is bigger than either half of a total number of blocks or number of blocks in one row, a horizontal centroid is checked to determine if the algorithm will skip the following block variance based detection modules and jump to transition map based detection; if not, the location centroid of the high variance blocks in the upper half of the image is extracted if the total number of the high variance blocks in the upper half of the image is larger than a third threshold which is one fourth of the number of blocks in one row of the image and the location centroid of the high variance blocks in the lower half of the image is extracted if the total number of high variance blocks in the lower half of the image is larger than the third threshold which is one fourth of the number of blocks in one row of the image. If the total number of high variance blocks in the whole image is larger than an image size adaptive threshold, the location centroid around variance is calculated for the upper half image, lower half image and the whole image. For the upper half image, if the image is vertical posed (height>width) and the upper horizontal centroid around variance is bigger than the upper vertical centroid around variance, the upper vertical centroid around variance is adjusted to be equal to 2 times of upper horizontal centroid around variance; and the centroid around variance of a whole image is then compared to an image adaptive threshold which is a percentage of the multiplication of total number blocks in one row and total number blocks in one column. If the centroid around variance for the whole image is less than the image size adaptive threshold, the processing jumps to an object of interest isolation module to conduct the block variance-based object of interest isolation; otherwise, the centroid around variance of the upper half image and lower half image are compared to an image adaptive threshold; and if any of them is less than the image adaptive threshold, processing jumps to the object of interest isolation module to conduct the block variance-based object of interest isolation; otherwise, the processing is continued to a transition map-based detection. The block variance-based object of interest isolation further comprises initializing a bounding box wherein initializing includes setting a bounding box width as half of an image width plus a six block width and a bounding box height equal to the bounding box width if the image width is larger than an image height, and setting the bounding box width as half of the image height and the bounding box height equal to the bounding box width plus a twelve block width if the image width is less than or equal to the image height, using a high variance block centroid as a bounding box center to draw the bounding box, and if the bounding box is over an image boundary, the bounding box is shifted in the image such that the bounding box has a minimum 3 blocks distance from the image boundary, separating the bounding box into 8×8 sub-boxes and counting the number of high variance blocks within each sub-box, applying a sub-box selection wherein for each row of sub-boxes, if the number of candidate blocks is larger than or equal to 2, the sub-box is denoted as an object sub-box, and if the number of candidate blocks is larger than 0 and one of the left neighbor sub-boxes has more than 2 candidate blocks within, the sub-box is denoted as an object sub-box, otherwise, the sub-box is denoted as a non-object sub-box and after the sub-box selection, generating a convex shape, for each row of sub-boxes, the leftmost object sub-box and rightmost object sub-box are found, and all of the sub-boxes between them are denoted as object sub-boxes, for each column of sub-boxes, the top object sub-box and bottom object sub-box are found, and all of the sub-boxes between them are denoted as object sub-boxes, the generated convex set is the isolated object of interest. Transition map-based detection further comprises extracting a block transition map, wherein the transition map is calculated by for each 8×8 luminance (Y) block and 4×4 chorminance (CbCr) block, calculating an intensity and pseudo-color saturation value, and computing a difference with eight neighbor blocks, finding a maximum from eight difference values, if the maximum is larger than a limit, the maximum is recorded as the transition value of the block. Otherwise, zero is recorded as the transition value of the block and after the blocks are processed, calculating a mean value of all of the non-zero transition value, and using the mean value as a new threshold to generate the final transition map, after the final transition map is generated, counting the total number of blocks with a non-zero transition value, and if this number is larger than a second limit, finding a qualified seed comprising calculating a horizontal and vertical location centroid of the blocks with non-zero transition value, if the distance between the centroid and any of the four image boundaries is less than or equal to a third limit, the transition map-based detection is terminated, and the detection result is negative; otherwise, checking the block located in the centroid position and its four neighbor blocks, if all of them have a zero transition value, then the centroid is selected as a qualified seed and center around growing process is applied around the seed; otherwise, checking the row of blocks in the same row as the centroid and the column of blocks in the same column as the centroid, if the centroid block has a zero transition value, and at least one side has no non-zero transition block, no qualified seed is able to be found, thus the transition map-based detection is terminated and the detection result is negative; otherwise, checking the horizontally left and right 10 blocks around the centroid, if there are eight connected blocks that have a zero transition value, the highlighted block is selected as a seed, and the center around growing process is applied around the seed to find all of the zero transition blocks that are able to be linked to the seed through other zero transition blocks and checking the vertically upper and lower 10 blocks around the centroid, if there are eight connected blocks that have a zero transition value, the highlighted block is selected as a seed, and the center around growing process is applied around the seed to find all of the zero transition blocks that are able to be linked to the seed through other zero transition blocks and after the growing process, comparing the growing shape size to the bounding box size, if the growing shape size is less than half of the bounding box size or less than two times of summation of total number of blocks in one row and one column of the image, then no object portrait is detected, otherwise, object of interest isolation is applied, including initializing a bounding box generated by the center around growing process and finding for each row of object blocks within the bounding box, the leftmost object block and rightmost object block, denoting all of the blocks between them as an object block, finding for each column of blocks, the top object block and bottom object block and denoting all of the blocks between them as object blocks. Using the mean value as the new threshold to generate the final transition map further comprises for each block, if a transition value is larger than the new threshold, the transition value is kept, for each block, if the left processed block has a non-zero transition and at least one of its right two neighbor blocks has a transition value larger than the new threshold, the transition value is stored as an original value plus one, for each block, if its upper block has a transition value larger than the threshold and at least one of its lower two neighbor blocks has transition value larger than the new threshold, its transition value is stored as the original value plus one and otherwise, the transition value is stored as zero. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a system implemented on a device comprises a block variance-based detection module configured for determining visually stand-out blocks, an object of interest isolation module operatively coupled to the block variance-based detection module, the object of interest isolation module configured for isolating an object of interest and a transition map-based detection module operatively coupled to the object of interest isolation module, the transition map-based detection module configured for determining an object portrait using a transition map. If the input image includes a stand-out object, the object of interest isolation module conducts the object of interest isolation. The transition map-based detection module is configured for generating a transition map based on a block difference between each block with neighboring blocks, determining if an object portrait is detected based on the transition map, if the object portrait is detected, then conducting the transition map-based object of interest isolation and if the object portrait is not detected, then the input image does not contain an object of interest. The block variance-based detection module is further configured for selecting visually stand-out blocks by comparing each block's variance with a content adaptive threshold and if a distribution compactness of the visually stand-out blocks is compact, the image includes the stand-out object. The transition map-based detection module is further configured for searching to find a qualified start point to start a center around growing; if the qualified start point is not found, then the transition map-based detection module returns negative; otherwise, if a growing result is successful, the object portrait is detected. The block variance-based detection module is further configured for implementing an adaptive block variance extraction process to calculate an adaptive 8×8 block variance for each block, if the obtained variance is larger than a threshold, the variance is kept; otherwise, the block is shifted, and a new, shifted block variance is calculated, if the variance of the shifted block is larger than the threshold, the shifted block variance is used as a current block variance; otherwise, the original block variance is used, after the block variances are obtained, a mean block variance value of high variance blocks is calculated, if the mean variance is larger than a second threshold, the mean value is set to the second threshold, and if the block variance is larger than the mean value, the block is selected as a high variance block and the high variance blocks are analyzed if their distribution is able to satisfy a stand-out criterion check. The system further comprising a distraction removal module configured for extracting a location centroid of the high variance blocks, counting a number of the high variance blocks in a left ¼ width image and a right ¼ width image, if any of the high variance blocks is bigger than either half of a total number of blocks or number of blocks in one row, a horizontal centroid is checked to determine if the algorithm will skip the following block variance based detection modules and jump to transition map based detection; if not, the location centroid of the high variance blocks in the upper half of the image is extracted if the total number of the high variance blocks in the upper half of the image is larger than a third threshold which is one fourth of the number of blocks in one row of the image and the location centroid of the high variance blocks in the lower half of the image is extracted if the total number of high variance blocks in the lower half of the image is larger than the third threshold which is one fourth of the number of blocks in one row of the image. If the total number of high variance blocks in the whole image is larger than an image size adaptive threshold, the location centroid around variance is calculated for the upper half image, lower half image and the whole image. For the upper half image, if the image is vertical posed (height>width) and the upper horizontal centroid around variance is bigger than the upper vertical centroid around variance, the upper vertical centroid around variance is adjusted to be equal to 2 times of upper horizontal centroid around variance; and the centroid around variance of a whole image is then compared to an image adaptive threshold which is a percentage of the multiplication of total number blocks in one row and total number blocks in one column. If the centroid around variance for the whole image is less than the image size adaptive threshold, the processing jumps to an object of interest isolation module to conduct the block variance-based object of interest isolation; otherwise, the centroid around variance of the upper half image and lower half image are compared to an image adaptive threshold; and if any of them is less than the image adaptive threshold, processing jumps to the object of interest isolation module to conduct the block variance-based object of interest isolation; otherwise, the processing is continued to a transition map-based detection. The object of interest isolation module is further configured for initializing a bounding box wherein initializing includes setting a bounding box width as half of an image width plus a six block width and a bounding box height equal to the bounding box width if the image width is larger than an image height, and setting the bounding box width as half of the image height and the bounding box height equal to the bounding box width plus a twelve block width if the image width is less than or equal to the image height, using a high variance block centroid as a bounding box center to draw the bounding box, and if the bounding box is over an image boundary, the bounding box is shifted in the image such that the bounding box has a minimum 3 blocks distance from the image boundary, separating the bounding box into 8×8 sub-boxes and counting the number of high variance blocks within each sub-box, applying a sub-box selection wherein for each row of sub-boxes, if the number of candidate blocks is larger than or equal to 2, the sub-box is denoted as an object sub-box, and if the number of candidate blocks is larger than 0 and one of the left neighbor sub-boxes has more than 2 candidate blocks within, the sub-box is denoted as an object sub-box, otherwise, the sub-box is denoted as a non-object sub-box and after the sub-box selection, generating a convex shape, for each row of sub-boxes, the leftmost object sub-box and rightmost object sub-box are found, and all of the sub-boxes between them are denoted as object sub-boxes, for each column of sub-boxes, the top object sub-box and bottom object sub-box are found, and all of the sub-boxes between them are denoted as object sub-boxes, the generated convex set is the isolated object of interest. Transition map-based detection module is further configured for extracting a block transition map, wherein the transition map is calculated by for each 8×8 luminance (Y) block and 4×4 chorminance (CbCr) block, calculating an intensity and pseudo-color saturation value, and computing a difference with eight neighbor blocks, finding a maximum from eight difference values, if the maximum is larger than a limit, the maximum is recorded as the transition value of the block. Otherwise, zero is recorded as the transition value of the block and after the blocks are processed, calculating a mean value of all of the non-zero transition value, and using the mean value as a new threshold to generate the final transition map, after the final transition map is generated, counting the total number of blocks with a non-zero transition value, and if this number is larger than a second limit, finding a qualified seed comprising calculating a horizontal and vertical location centroid of the blocks with non-zero transition value, if the distance between the centroid and any of the four image boundaries is less than or equal to a third limit, the transition map-based detection is terminated, and the detection result is negative; otherwise, checking the block located in the centroid position and its four neighbor blocks, if all of them have a zero transition value, then the centroid is selected as a qualified seed and center around growing process is applied around the seed; otherwise, checking the row of blocks in the same row as the centroid and the column of blocks in the same column as the centroid, if the centroid block has a zero transition value, and at least one side has no non-zero transition block, no qualified seed is able to be found, thus the transition map-based detection is terminated and the detection result is negative; otherwise, checking the horizontally left and right 10 blocks around the centroid, if there are eight connected blocks that have a zero transition value, the highlighted block is selected as a seed, and the center around growing process is applied around the seed to find all of the zero transition blocks that are able to be linked to the seed through other zero transition blocks and checking the vertically upper and lower 10 blocks around the centroid, if there are eight connected blocks that have a zero transition value, the highlighted block is selected as a seed, and the center around growing process is applied around the seed to find all of the zero transition blocks that are able to be linked to the seed through other zero transition blocks and after the growing process, comparing the growing shape size to the bounding box size, if the growing shape size is less than half of the bounding box size or less than two times of summation of total number of blocks in one row and one column of the image, then no object portrait is detected, otherwise, object of interest isolation is applied, including initializing a bounding box generated by the center around growing process and finding for each row of object blocks within the bounding box, the leftmost object block and rightmost object block, denoting all of the blocks between them as an object block, finding for each column of blocks, the top object block and bottom object block and denoting all of the blocks between them as object blocks. Using the mean value as the new threshold to generate the final transition map further comprises for each block, if a transition value is larger than the new threshold, the transition value is kept, for each block, if the left processed block has a non-zero transition and at least one of its right two neighbor blocks has a transition value larger than the new threshold, the transition value is stored as an original value plus one, for each block, if its upper block has a transition value larger than the threshold and at least one of its lower two neighbor blocks has transition value larger than the new threshold, its transition value is stored as the original value plus one and otherwise, the transition value is stored as zero. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a device comprises a memory for storing an application, the application configured for processing an input image using a block variance-based detection module, if the input image includes a stand-out object, conducting a block variance-based object of interest isolation and otherwise, implementing a transition map-based detection comprising generating a transition map based on a block difference between each block with neighboring blocks, determining if an object portrait is detected based on the transition map, if the object portrait is detected, then conducting the transition map-based object of interest isolation and if the object portrait is not detected, then the input image does not contain an object of interest and a processing component coupled to the memory, the processing component configured for processing the application. Processing the input image includes selecting visually stand-out blocks by comparing each block's variance with a content adaptive threshold and if a distribution compactness of the visually stand-out blocks is compact, the image includes the stand-out object. The device further comprises searching to find a qualified start point to start a center around growing; if the qualified start point is not found, then the transition map-based detection module returns negative; otherwise, if a growing result is successful, the object portrait is detected. The block variance-based detection module is configured for implementing an adaptive block variance extraction method to calculate an adaptive 8×8 block variance for each block, if the obtained variance is larger than a threshold, the variance is kept; otherwise, the block is shifted, and a new, shifted block variance is calculated, if the variance of the shifted block is larger than the threshold, the shifted block variance is used as a current block variance; otherwise, the original block variance is used, after the block variances are obtained, a mean block variance value of high variance blocks is calculated, if the mean variance is larger than a second threshold, the mean value is set to the second threshold, and if the block variance is larger than the mean value, the block is selected as a high variance block and the high variance blocks are analyzed if their distribution is able to satisfy a stand-out criterion check. The device further comprises using a distraction removal module configured for extracting a location centroid of the high variance blocks, counting a number of the high variance blocks in a left ¼ width image and a right ¼ width image, if any of the high variance blocks is bigger than either half of a total number of blocks or number of blocks in one row, a horizontal centroid is checked to determine if the algorithm will skip the following block variance based detection modules and jump to transition map based detection; if not, the location centroid of the high variance blocks in the upper half of the image is extracted if the total number of the high variance blocks in the upper half of the image is larger than a third threshold which is one fourth of the number of blocks in one row of the image and the location centroid of the high variance blocks in the lower half of the image is extracted if the total number of high variance blocks in the lower half of the image is larger than the third threshold which is one fourth of the number of blocks in one row of the image. If the total number of high variance blocks in the whole image is larger than an image size adaptive threshold threshold, the location centroid around variance is calculated for the upper half image, lower half image and the whole image. For the upper half image, if the image is vertical posed (height>width) and the upper horizontal centroid around variance is bigger than the upper vertical centroid around variance, the upper vertical centroid around variance is adjusted to be equal to 2 times of upper horizontal centroid around variance; and the centroid around variance of a whole image is then compared to an image adaptive threshold which is a percentage of the multiplication of total number blocks in one row and total number blocks in one column. If the centroid around variance for the whole image is less than the image size adaptive threshold, the processing jumps to an object of interest isolation module to conduct the block variance-based object of interest isolation; otherwise, the centroid around variance of the upper half image and lower half image are compared to an image adaptive threshold; and if any of them is less than the image adaptive threshold, processing jumps to the object of interest isolation module to conduct the block variance-based object of interest isolation; otherwise, the processing is continued to a transition map-based detection. The block variance-based object of interest isolation further comprises initializing a bounding box wherein initializing includes setting a bounding box width as half of an image width plus a six block width and a bounding box height equal to the bounding box width if the image width is larger than an image height, and setting the bounding box width as half of the image height and the bounding box height equal to the bounding box width plus a twelve block width if the image width is less than or equal to the image height, using a high variance block centroid as a bounding box center to draw the bounding box, and if the bounding box is over an image boundary, the bounding box is shifted in the image such that the bounding box has a minimum 3 blocks distance from the image boundary, separating the bounding box into 8×8 sub-boxes and counting the number of high variance blocks within each sub-box, applying a sub-box selection wherein for each row of sub-boxes, if the number of candidate blocks is larger than or equal to 2, the sub-box is denoted as an object sub-box, and if the number of candidate blocks is larger than 0 and one of the left neighbor sub-boxes has more than 2 candidate blocks within, the sub-box is denoted as an object sub-box, otherwise, the sub-box is denoted as a non-object sub-box and after the sub-box selection, generating a convex shape, for each row of sub-boxes, the leftmost object sub-box and rightmost object sub-box are found, and all of the sub-boxes between them are denoted as object sub-boxes, for each column of sub-boxes, the top object sub-box and bottom object sub-box are found, and all of the sub-boxes between them are denoted as object sub-boxes, the generated convex set is the isolated object of interest. Transition map-based detection further comprises extracting a block transition map, wherein the transition map is calculated by for each 8×8 luminance (Y) block and 4×4 chorminance (CbCr) block, calculating an intensity and pseudo-color saturation value, and computing a difference with eight neighbor blocks, finding a maximum from eight difference values, if the maximum is larger than a limit, the maximum is recorded as the transition value of the block. Otherwise, zero is recorded as the transition value of the block and after the blocks are processed, calculating a mean value of all of the non-zero transition value, and using the mean value as a new threshold to generate the final transition map, after the final transition map is generated, counting the total number of blocks with a non-zero transition value, and if this number is larger than a second limit, finding a qualified seed comprising calculating a horizontal and vertical location centroid of the blocks with non-zero transition value, if the distance between the centroid and any of the four image boundaries is less than or equal to a third limit, the transition map-based detection is terminated, and the detection result is negative; otherwise, checking the block located in the centroid position and its four neighbor blocks, if all of them have a zero transition value, then the centroid is selected as a qualified seed and center around growing process is applied around the seed; otherwise, checking the row of blocks in the same row as the centroid and the column of blocks in the same column as the centroid, if the centroid block has a zero transition value, and at least one side has no non-zero transition block, no qualified seed is able to be found, thus the transition map-based detection is terminated and the detection result is negative; otherwise, checking the horizontally left and right 10 blocks around the centroid, if there are eight connected blocks that have a zero transition value, the highlighted block is selected as a seed, and the center around growing process is applied around the seed to find all of the zero transition blocks that are able to be linked to the seed through other zero transition blocks and checking the vertically upper and lower 10 blocks around the centroid, if there are eight connected blocks that have a zero transition value, the highlighted block is selected as a seed, and the center around growing process is applied around the seed to find all of the zero transition blocks that are able to be linked to the seed through other zero transition blocks and after the growing process, comparing the growing shape size to the bounding box size, if the growing shape size is less than half of the bounding box size or less than two times of summation of total number of blocks in one row and one column of the image, then no object portrait is detected, otherwise, object of interest isolation is applied, including initializing a bounding box generated by the center around growing process and finding for each row of object blocks within the bounding box, the leftmost object block and rightmost object block, denoting all of the blocks between them as an object block, finding for each column of blocks, the top object block and bottom object block and denoting all of the blocks between them as object blocks. Using the mean value as the new threshold to generate the final transition map further comprises for each block, if a transition value is larger than the new threshold, the transition value is kept, for each block, if the left processed block has a non-zero transition and at least one of its right two neighbor blocks has a transition value larger than the new threshold, the transition value is stored as an original value plus one, for each block, if its upper block has a transition value larger than the threshold and at least one of its lower two neighbor blocks has transition value larger than the new threshold, its transition value is stored as the original value plus one and otherwise, the transition value is stored as zero. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a camera comprises a lens, a sensor configured for acquiring an input image through the lens, a memory for storing an application, the application configured for processing the input image using a block variance-based detection module, if the input image includes a stand-out object, conducting a block variance-based object of interest isolation and otherwise, implementing a transition map-based detection comprising generating a transition map based on a block difference between each block with neighboring blocks, determining if an object portrait is detected based on the transition map, if the object portrait is detected, then conducting the transition map-based object of interest isolation and if the object portrait is not detected, then the input image does not contain an object of interest and a processing component coupled to the memory, the processing component configured for processing the application.

DETAILED DESCRIPTION OF THE PREFERRED EMBODIMENT

The term "object portrait" is used to represent a photograph or image with a stand-out object or a set of stand-out objects. Object portraits are able to be detected, and then the object of interest area is isolated in a low complexity way without any human intervention. A set of tools include block variance-based detection and object of interest isolation, block transition-based detection and object of interest isolation. By effectively integrating these tools together, the object portrait images and non-object portrait images are successfully identified. The meaningful object of interest area is also successfully isolated.

Figure 1:
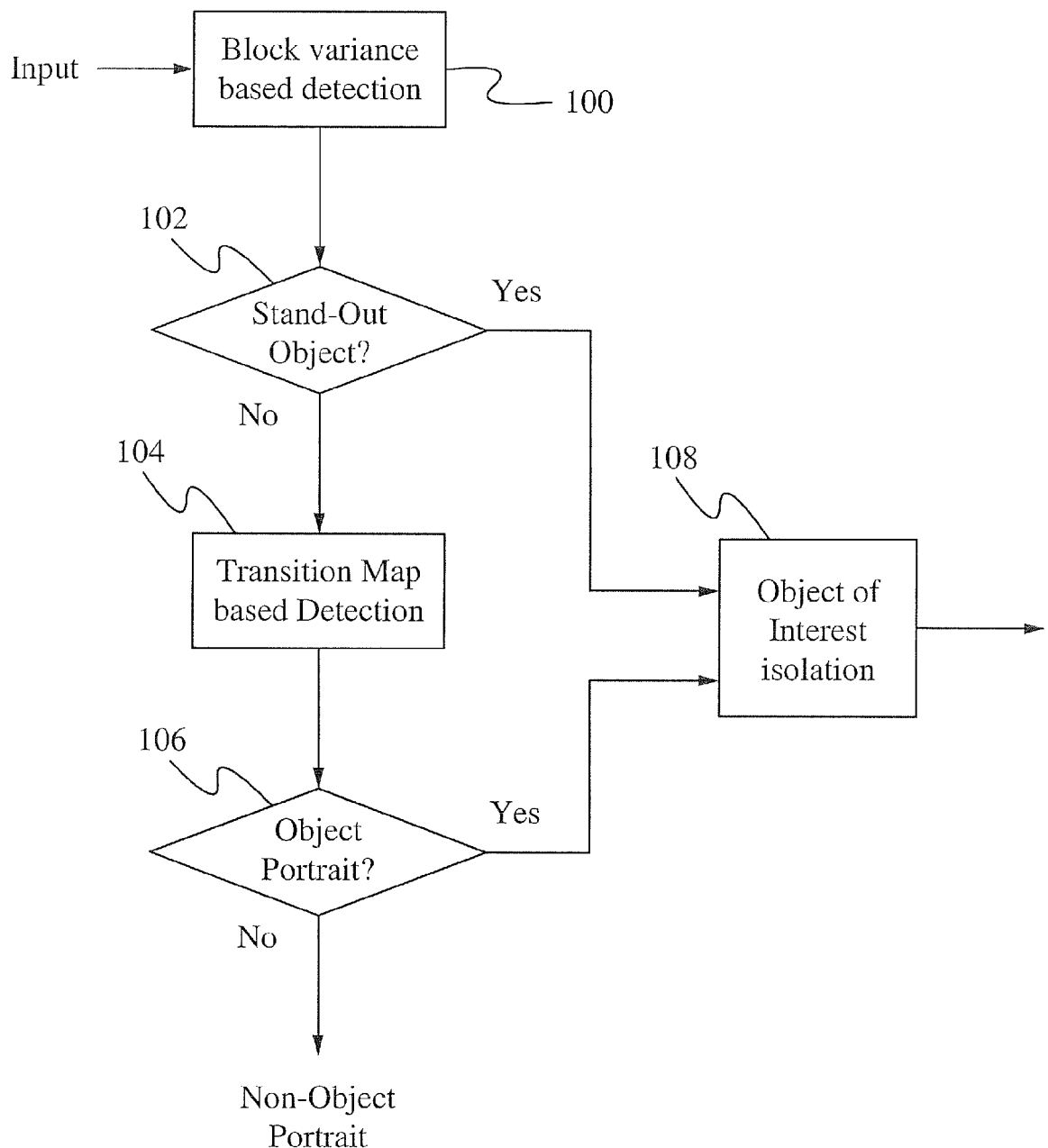
FIG. 1 illustrates a flowchart of an overall architecture of the method of detecting images according to some embodiments.

FIG. 1 illustrates a flowchart of an overall architecture of the method of detecting images. An input image is processed by a block variance-based detection module, in the step 100. In the block variance-based detection module, the visually stand-out blocks are selected by comparing each block's variance with a content adaptive threshold. The distribution compactness of visual stand-out blocks is extracted. If the distribution compactness is compact enough, the image has a very obvious stand-out object. In the step 102, if the image has a stand-out object (e.g. is an object portrait), then the processing directly jumps to an object of interest isolation module to conduct block variance-based object of interest isolation. In the step 102, if the detection result is not good enough (e.g. distribution compactness not compact enough), processing continues to a transition map-based detection module. In the step 104, in the transition map-based detection module, a transition map is generated based on a block difference between each block with its neighbor blocks (e.g. eight neighbor blocks). After the transition map is obtained, a search procedure searches to find a qualified start point to start a center around growing. If a qualified start point is not found, then the transition map-based detection returns negative, in the step 106. Otherwise, in the step 106, if the growing result satisfies certain criteria, the object portrait is detected, and the process goes to the step 108. Object of interest isolation is conducted accordingly, in the step 108.

Block Variance-Based Object Portrait Detection

When an image is viewed as an object portrait by a human being, there is usually a stand-out object having an obvious difference from its surrounding area. One way to measure the difference is to calculate the block variance because the block that crosses the object boundary usually has a higher block variance. If the image has a set of high variance blocks in a relative compact area, it is very possible that this image is an object portrait. The block variance-based object portrait detection scheme is based on this concept.

Figure 2:
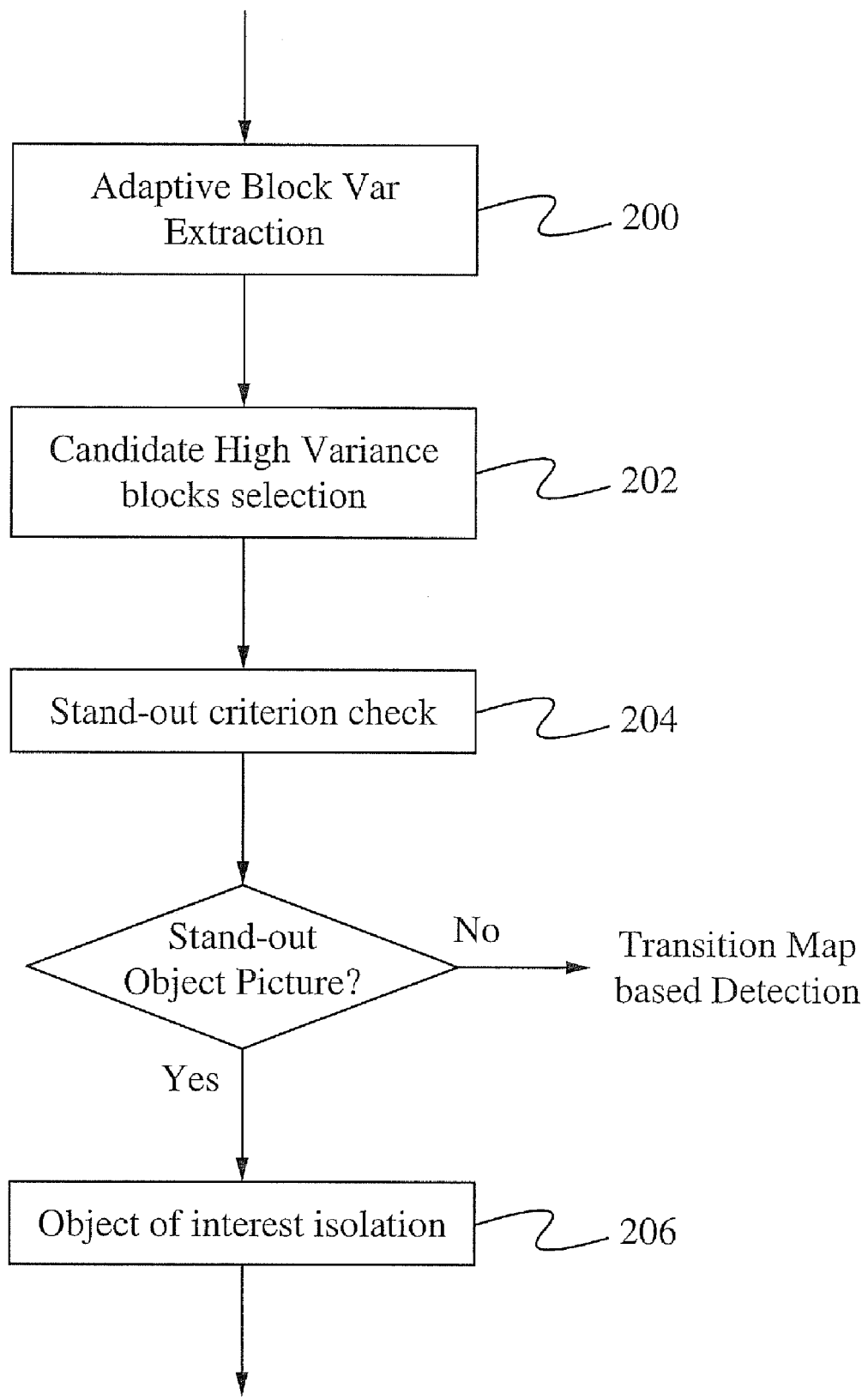
FIG. 2 illustrates a flowchart of a block variance-based object portrait detection scheme according to some embodiments.

The block variance-based object portrait detection scheme according to some embodiments is illustrated in FIG. 2. In the step 200, an adaptive block variance extraction method is used to calculate an adaptive 8×8 block variance for each block.

The adaptive block variance extraction method includes calculating the normal 8×8 block variance using, for example:

$$VAR_{Normal} = \frac{1}{64} \sum_{i=0,j=0}^{i=7,j=7} \left( P(i,j) - \frac{1}{64} \sum_{i=0,j=0}^{i=7,j=7} P(i,j) \right)^2$$

If the obtained variance is larger than a threshold (e.g. 360), the variance is kept. Otherwise, the block is shifted, and a new block variance is calculated using, for example:

$$VAR_{Shift} = \frac{1}{64} \sum_{i=4,j=4}^{i=11,j=11} \left( P(i,j) - \frac{1}{64} \sum_{i=4,j=4}^{i=11,j=11} P(i,j) \right)^2$$

If the variance of the shifted block is larger than a threshold (e.g. 360), the shifted block variance is used as the current block variance. Otherwise, the original normal block variance is used.

After the block variance values are obtained in the step 200, the mean block variance value of the high variance blocks is calculated, in the step 202, for example, using:

$$VAR_{mean} = \frac{1}{N} \sum_{VAR()>360} VAR()$$

In the above equation, N denotes the number of high variance blocks that satisfy the greater than 360 condition. If this mean value is larger than a threshold (e.g. 1600), the mean value is set as 1600. This mean value is then utilized to determine if a block is a candidate high variance block or not. If the block variance is larger than the mean value, it is selected as high variance block. Otherwise, it is not selected.

After the above candidate high variance blocks selection in the step 202, the high variance blocks are analyzed if their distribution is able to satisfy the stand-out criterion check, in the step 204. The check process is further illustrated in the FIG. 3.

If a stand-out object picture is determined in the step 204, then the process of object of interest isolation occurs in the step 206. If a stand-out object picture is not determined in the step 204, then the process goes to transition map-based detection.

Centroid Around Variance for Stand-Out Criterion Check

Figure 3:
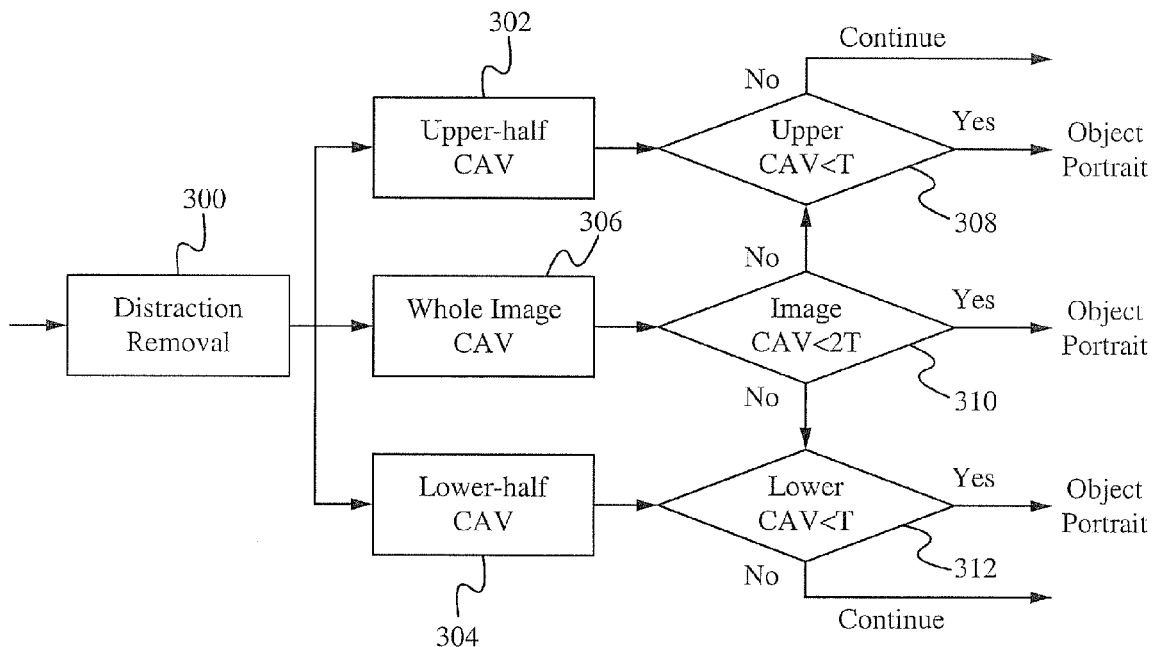
FIG. 3 illustrates a flowchart of a centroid around variance-based stand-out criterion check according to some embodiments.

FIG. 3 illustrates a flowchart of a centroid around variance-based stand-out criterion check according to some embodiments. CAV denotes Centroid Around Variance. In the step 300, in a distraction removal module, the location centroid of the candidate high variance blocks is extracted. The centroid is calculated by the following equations where the mean value of horizontal location and vertical location of all of the high variance blocks are calculated.

$$Centroid_{Horizontal} = \frac{1}{N} \sum_{BK(i,j) \in candidate} j$$

$$Centroid_{Vertical} = \frac{1}{N} \sum_{BK(i,j) \in candidate} i$$

The number of candidate high variance blocks in a left ¼ width image and a right ¼ width image are counted. If any of them is bigger than either half of the total number of candidate blocks or number of blocks in one row, the horizontal centroid is checked. If the following condition is not satisfied, the algorithm will skip the following block variance based detection modules and jump to transition map based detection.

$$\frac{bk_{width}}{2} - 10 \leq Centroid_{Horizontal} \leq \frac{bk_{width}}{2} - 10$$

During the above process, the location centroid of the candidate high variance blocks in the upper half of the image is also extracted if the total number of candidate high variance blocks in the upper half of the image is larger than a threshold which is one fourth of the number of blocks in one row of an image. A similar procedure is also applied to a lower half picture.

If the total number of candidate high variance blocks in the whole image is larger than a threshold (e.g. 20), the location centroid around variance is calculated for the upper half image in the step 302, lower half image in the step 304 and the whole image in the step 306, separately by the following equation (the total number of candidate high variance blocks in the upper half and lower half image also has to be bigger than a threshold respectively to make its location centroid around variance valid):

$$VAR_{CA} = \frac{1}{N} \left( \sum_{BK(i,j) \in candidate} (j - Centroid_{Horizontal})^2 + \sum_{BK(i,j) \in candidate} (i - Centroid_{Horizontal})^2 \right)$$

For the upper half image $VAR_{CA}$, if the image is vertical posed (height>width) and the upper horizontal centroid around variance is bigger than the upper vertical centroid around variance, it is adjusted to be equal to 2 times of upper horizontal centroid around variance.

The centroid around variance of a whole image is then compared to an image adaptive threshold which is a percentage of the multiplication of total number blocks in one row and total number blocks in one column (T is used for the threshold in the diagram), in the step 310.

$$VAR_{TH} = \frac{1}{32}(BK_{width} \times BK_{height})$$

If the centroid around variance for the whole image is less than the threshold, it is very confident to conclude this image is an object portrait. The processing will directly jump to the object of interest isolation module to conduct block variance based object of interest isolation. Otherwise, the following is applied.

The centroid around variance of the upper half image and lower half image are then compared to the image adaptive threshold $VAR_{TH}$, in the steps 308 and 312, respectively. If any of them is less than the threshold, a confidence value is set to a value (e.g. 3) and the process jumps to the object of interest isolation module. Otherwise, the processing is continued to a transition map-based detection.

Object of Interest Isolation

Figure 4:
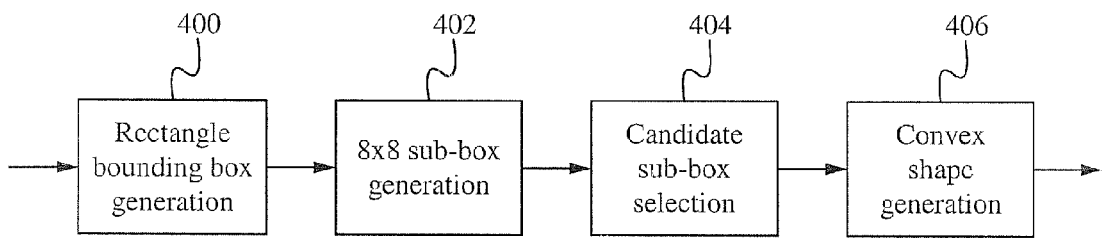
FIG. 4 illustrates a flowchart of a block variance-based object of interest isolation according to some embodiments.

The block variance-based object of interest isolation according to some embodiments is illustrated by FIG. 4 and conducted by the following procedure.

In the step 400, a bounding box (e.g. rectangular, circular, spherical, square, triangular or another shape) is initialized. Initializing includes setting the bounding box width as half of an image width plus a six block width and a bounding box height equal to the bounding box width if an image width is larger than an image height, and setting the bounding box width as half of the image height and the bounding box height equal to the bounding box width plus twelve block width if the image width is less than or equal to the image height. Initializing also includes using the candidate high variance block centroid as the bounding box center to draw the bounding box. If the bounding box is over the image boundary, the bounding box is shifted in the image such that the bounding box has a minimum 3 blocks distance from the image boundary.

In the step 402, the bounding box is separated into 8×8 sub-boxes, and the number of candidate high variance blocks within each sub-box are counted.

In the step 404, the candidate sub-box selection is then applied. For each row of sub-boxes, if the number of candidate blocks is larger than or equal to 2, the sub-box is denoted as an object sub-box. If the number of candidate blocks is larger than 0, and one of its left neighbor sub-boxes has more than 2 candidate blocks within it, the sub-box is denoted as an object sub-box. Otherwise, the sub-box is denoted as a non-object sub-box.

After the sub-box selection, a convex shape is generated in the step 406. For each row of sub-boxes, the leftmost object sub-box and rightmost object sub-box are found, and all of the sub-boxes between them are denoted as object sub-boxes. For each column of sub-boxes, the top object sub-box and bottom object sub-box are found, and all of the sub-boxes between them are denoted as object sub-boxes. The generated convex set is the isolated object of interest.

Figure 5:
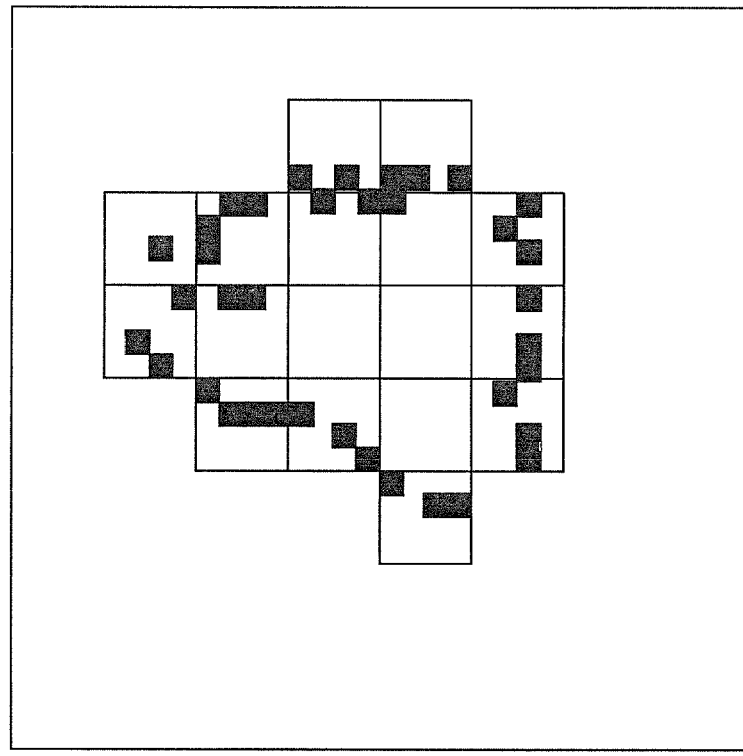
FIG. 5 illustrates a diagram of a block variance-based object of interest isolation according to some embodiments.
Figure 5:
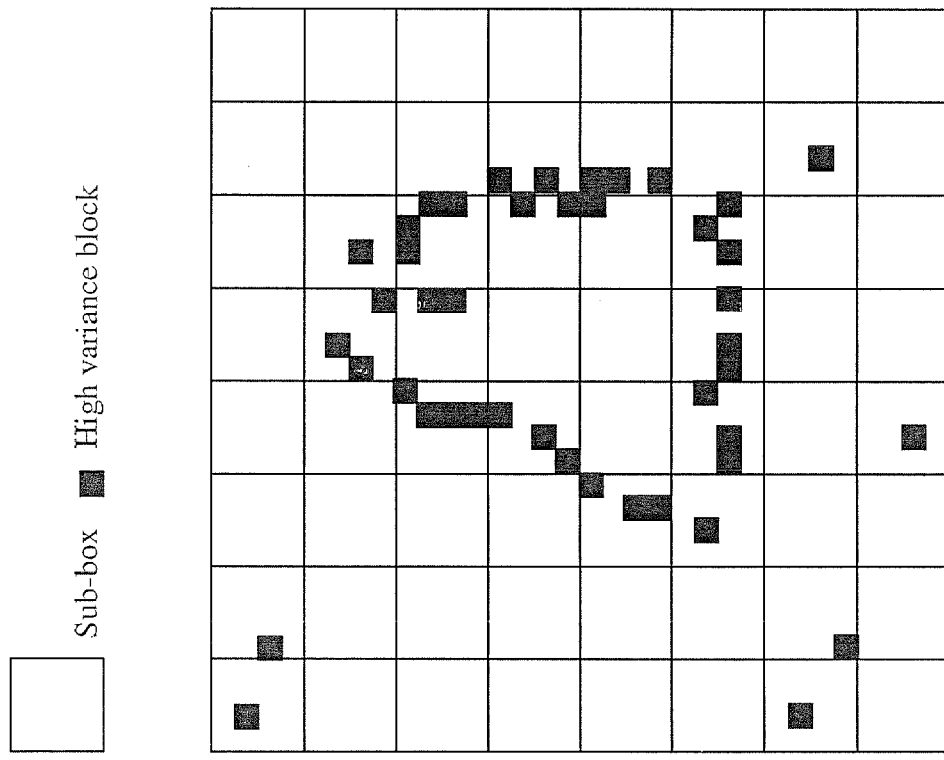

The block variance-based object of interest isolation procedure is illustrated in FIG. 5. By using the block variance-based object of interest isolation procedure the larger image 500 is able to be narrowed down to the object of interest 502.

Block Transition Map Based Object Portrait Detection

For some object portrait images, the body of the object of interest shows similarity while different from the surrounding area. With the appropriate transition detection, there is no transition change within the body of the object. The big transition change only occurs along the object boundary and the area with cluttered background. Therefore, if a big enough closed shape is able to be found in the transition map, it is possible that the shape belongs to a stand-out object. The block transition map-based object portrait detection scheme is developed based on this.

Figure 6:
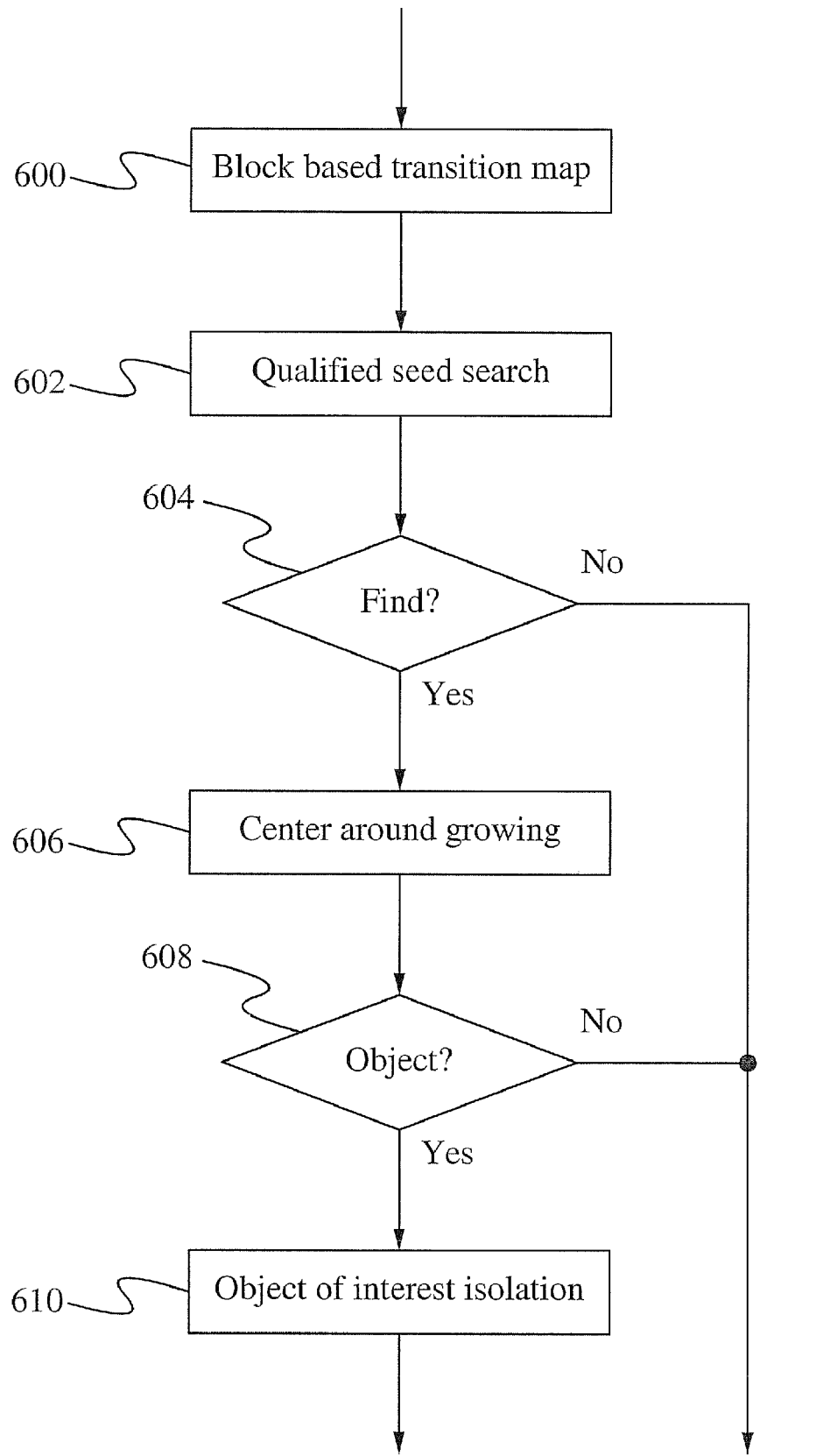
FIG. 6 illustrates a flowchart of a block transition map-based object portrait detection scheme according to some embodiments.

The block transition map-based object portrait detection scheme is illustrated in FIG. 6. In the step 600, a block transition map is extracted. The block transition map is calculated by the following procedure.

For each 8×8 luminance (Y) block and 4×4 chorminance (CbCr) block, its intensity and pseudo-color saturation value are calculated, and the difference with its eight neighbor blocks are computed by the following equation (quantized intensity and pseudo-color saturation value are used from the previous calculation).

$$\text{Diff}=16*|\text{Intensity}-\text{Intensity}_{neighbor}|+32*|\text{Saturation}-\text{Saturation}_{neighbor}|$$

The maximum from eight difference values is found. If the maximum is larger than 30, for example, the maximum is recorded as the transition value of the block. Otherwise, zero is recorded as the transition value of the block.

After all of the blocks are processed, the mean value of all of the non-zero transition values is calculated, and the mean value is used as a new threshold to generate the final transition map as follows:

For each block, if its transition value is larger than the threshold, its transition value is kept. For each block, if its left processed block has a non-zero transition and at least one of its right two neighbor blocks has a transition value larger than the threshold, its transition value is stored as an original value plus one. For each block, if its upper block has a transition value larger than the threshold, and at least one of its lower two neighbor blocks has transition value larger than the threshold, its transition value is stored as an original value plus one. Otherwise, its transition value is stored as zero.

After the transition map is generated, the total number of blocks with a non-zero transition value is counted. If this number is larger than 50, the following procedures are used to find the qualified seed, in the step 602.

The horizontal and vertical location centroid of the blocks with non-zero transition value are calculated. In the step 604, if the distance between the centroid and any of the four image boundaries is less than or equal to 10, for example, the transition map-based detection is terminated, and the detection result is negative. Otherwise, the process goes to the following procedure.

The block located in the centroid position and its four neighbor blocks are checked, in the step 602. If all of them have a zero transition value, then the centroid is selected as a qualified seed and center around the growing process is applied around the seed, in the step 604. Otherwise, the process goes to the following procedure.

The row of blocks in the same row as the centroid and the column of blocks in the same column as the centroid are checked, in the step 602. If the centroid block has a zero transition value, and at least one side of it has no non-zero transition block, no qualified seed is able to be found. Thus, the transition map-based detection is terminated and the detection result is negative, in the step 604. Otherwise, the process goes to the following procedure.

Figure 7A:
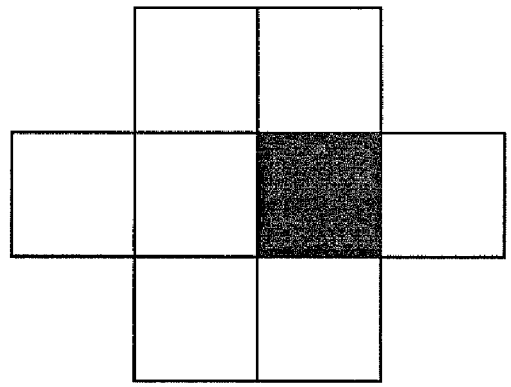
FIG. 7A illustrates a diagram of a block with a selected seed according to some embodiments.

The horizontally left and right 10 blocks around the centroid are checked (if the centroid is in the left side of the image, only check its right 10 blocks). If there are eight connected blocks, as shown in FIG. 7A, that have a zero transition value, the highlighted block is selected as a seed, and the center around growing process is applied around the seed to find all of the zero transition blocks that are able to be linked to the seed through other zero transition blocks, in the step 606. Otherwise, the process goes to the next step.

Figure 7B:
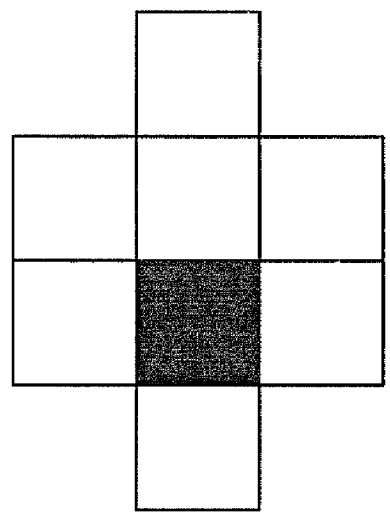
FIG. 7B illustrates a diagram of a block with a selected seed according to some embodiments.

The vertically upper and lower 10 blocks around the centroid are checked. If there are eight connected blocks, as shown in FIG. 7B, that have a zero transition value, the highlighted block is selected as a seed, and the center around growing process is applied around the seed to find all of the zero transition blocks that are able to be linked to the seed through other zero transition blocks, in the step 606. Otherwise, the transition map based detection returns negative.

After the growing process, the growing shape size is compared to the rectangle bounding box size, in the step 608. If the growing shape size is less than half of the bounding box size or less than two times of summation of total number of blocks in one row and one column of the image, then no object portrait is detected, in the step 608. Otherwise, in the step 610, object of interest isolation is applied as follows:

A bounding box generated by the center around growing process is initialized. For each row of object blocks within the bounding box, the leftmost object block and rightmost object block are found, and all of the blocks between them are denoted as an object block. For each column of blocks, the top object block and bottom object block are found, and all of the blocks between them are denoted as object blocks. The resulted convex set is used as the object of interest isolation result.

Figure 8:
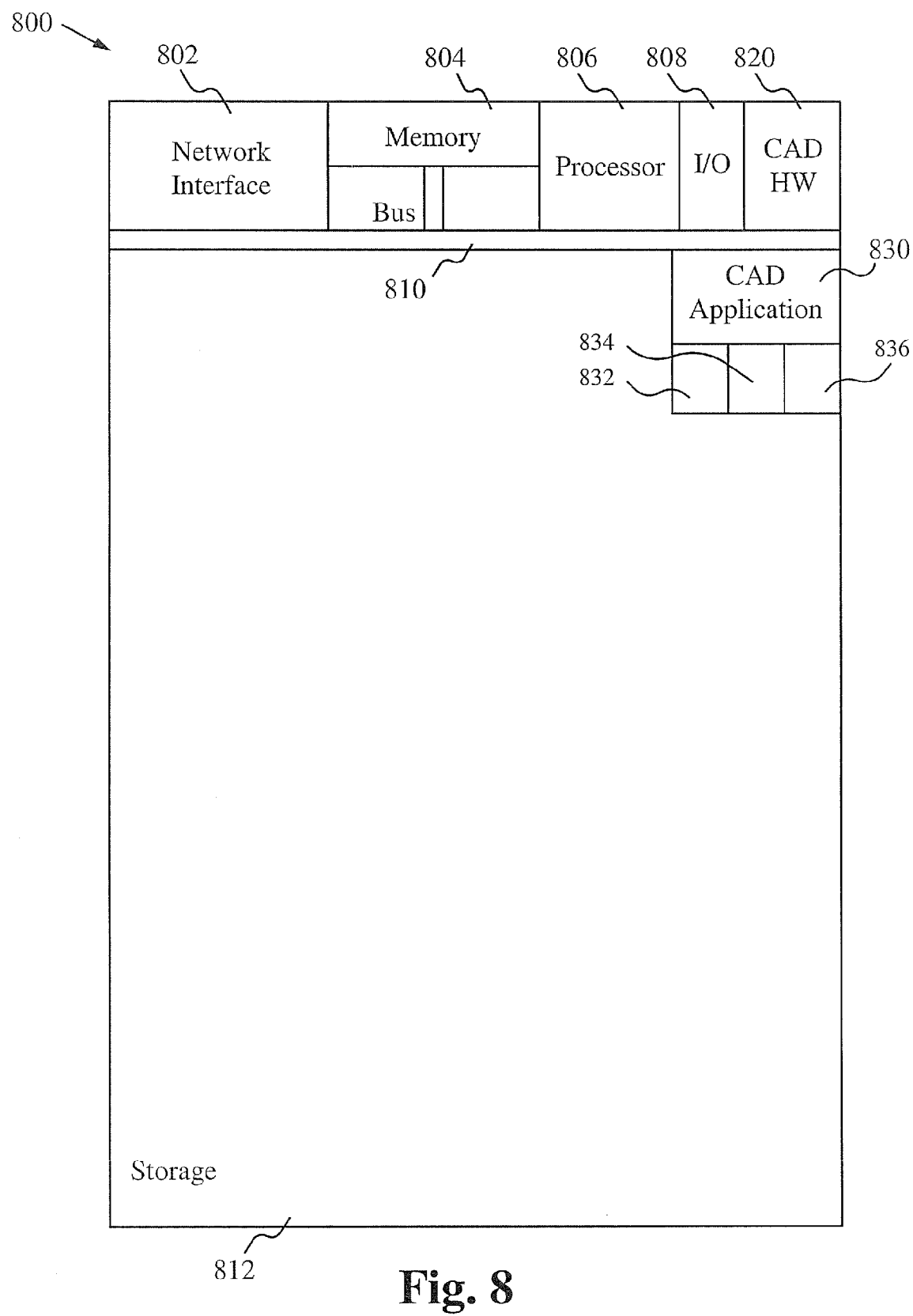
FIG. 8 illustrates a block diagram of an exemplary computing device configured to implement content adaptive detection of images with a stand-out image according to some embodiments.

FIG. 8 illustrates a block diagram of an exemplary computing device 800 configured to implement content adaptive detection of images with a stand-out image according to some embodiments. The computing device 800 is able to be used to acquire, store, compute, communicate and/or display information such as images and videos. For example, a computing device 800 is able to acquire and store an image. The content adaptive detection method is able to be used to detect images with a stand-out image on the device 800. In general, a hardware structure suitable for implementing the computing device 800 includes a network interface 802, a memory 804, a processor 806, I/O device(s) 808, a bus 810 and a storage device 812. The choice of processor is not critical as long as a suitable processor with sufficient speed is chosen. The memory 804 is able to be any conventional computer memory known in the art. The storage device 812 is able to include a hard drive, CDROM, CDRW, DVD, DVDRW, flash memory card or any other storage device. The computing device 800 is able to include one or more network interfaces 802. An example of a network interface includes a network card connected to an Ethernet or other type of LAN. The I/O device(s) 808 are able to include one or more of the following: keyboard, mouse, monitor, display, printer, modem, touchscreen, button interface and other devices. Content adaptive detection application(s) 830 used to perform the content adaptive detection method are likely to be stored in the storage device 812 and memory 804 and processed as applications are typically processed. More or less components shown in FIG. 8 are able to be included in the computing device 800. In some embodiments, content adaptive detection hardware 820 is included. Although the computing device 800 in FIG. 8 includes applications 830 and hardware 820 for content adaptive detection, the content adaptive detection method is able to be implemented on a computing device in hardware, firmware, software or any combination thereof.

In some embodiments, the content adaptive detection application(s) 830 include several applications and/or modules. A block variance-based detection module 832 is configured for determining visually stand-out blocks. An object of interest isolation module 834 is configured for isolating an object of interest as described herein. A transition map-based detection module 836 is configured for determining an object portrait using a transition map as described herein. Fewer or additional modules are able to be included as well.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television, a home entertainment system or any other suitable computing device.

A specific example of a computing device implementing content adaptive detection is a camera which includes a lens, a sensor such as a Charge-Coupled Device (CCD) or Complementary Metal Oxide Semiconductor (CMOS), a storage component such as a hard drive or a flash memory, a processing component and other standard image acquisition components. The camera functions as any other camera, for example, when a user presses a button to acquire an image, the lens, sensor and processor function together to acquire the desired image. The content adaptive detection is able to be used in conjunction with the standard functionality of the camera to detect and acquire a stand-out object.

To utilize the content adaptive detection, a user acquires an image such as by a digital camera, and then while the image is acquired or after the image is acquired, the image is able to be processed using the content adaptive detection method. In some embodiments, the camera automatically implements the content adaptive detection, and in some embodiments, a user manually selects to implement the content adaptive detection.

In operation, the content adaptive detection method enables detection of images with a stand-out object. The content adaptive detection method enables automated detection of an object in an image and isolation of the object. For example, a full image that includes a person is able to be modified so that the person is isolated and the image becomes more of a portrait-type image. The content adaptive detection method utilizes a block variance-based detection to determine a stand-out object, and if a stand-out object is not determined, a transition map-based detection to determine an object portrait. Then, the object of interest or objects of interest are isolated.

In some embodiments, media able to utilize the method described herein includes but is not limited to images, videos and other data.

Embodiments of Content Adaptive Detection

1. A method implemented on a device comprising:
   a. processing an input image using a block variance-based detection module;
   b. if the input image includes a stand-out object, conducting a block variance-based object of interest isolation; and
   c. otherwise, implementing a transition map-based detection comprising:
      i. generating a transition map based on a block difference between each block with neighboring blocks;
      ii. determining if an object portrait is detected based on the transition map;
      iii. if the object portrait is detected, then conducting the transition map-based object of interest isolation; and
      iv. if the object portrait is not detected, then the input image does not contain an object of interest.

2. The method of clause 1 wherein processing the input image includes selecting visually stand-out blocks by comparing each block's variance with a content adaptive threshold and if a distribution compactness of the visually stand-out blocks is compact, the image includes the stand-out object.

3. The method of clause 1 further comprising searching to find a qualified start point to start a center around growing; if the qualified start point is not found, then the transition map-based detection module returns negative; otherwise, if a growing result is successful, the object portrait is detected.

4. The method of clause 1 wherein the block variance-based detection module is configured for implementing:
   a. an adaptive block variance extraction method to calculate an adaptive 8×8 block variance for each block;
   b. if the obtained variance is larger than a threshold, the variance is kept; otherwise, the block is shifted, and a new, shifted block variance is calculated;
   c. if the variance of the shifted block is larger than the threshold, the shifted block variance is used as a current block variance; otherwise, the original block variance is used;
   d. after the block variances are obtained, a mean block variance value of high variance blocks is calculated;
   e. if the mean variance is larger than a second threshold, the mean value is set to the second threshold, and if the block variance is larger than the mean value, the block is selected as a high variance block; and
   f. the high variance blocks are analyzed if their distribution is able to satisfy a stand-out criterion check.

5. The method of clause 4 further comprising using a distraction removal module configured for:
   a. extracting a location centroid of the high variance blocks;
   b. counting a number of the high variance blocks in a left ¼ width image and a right ¼ width image;
   c. if any of the high variance blocks is bigger than either half of a total number of blocks or number of blocks in one row, a horizontal centroid is checked to determine if the algorithm will skip the following block variance based detection modules and jump to transition map based detection;
   d. the location centroid of the high variance blocks in the upper half of the image is extracted if the total number of the high variance blocks in the upper half of the image is larger than a third threshold which is one fourth of the number of blocks in one row of the image; and
   e. the location centroid of the high variance blocks in the lower half of the image is extracted if the total number of high variance blocks in the lower half of the image is larger than the third threshold which is one fourth of the number of blocks in one row of the image.

6. The method of clause 5 wherein if the total number of high variance blocks in the whole image is larger than an image size adaptive threshold, the location centroid around variance is calculated for the upper half image, lower half image and the whole image.

7. The method of clause 6 wherein for the upper half image, if the image is vertical posed (height>width) and the upper horizontal centroid around variance is bigger than the upper vertical centroid around variance, the upper vertical centroid around variance is adjusted to be equal to 2 times of upper horizontal centroid around variance; and the centroid around variance of a whole image is then compared to an image adaptive threshold which is a percentage of the multiplication of total number blocks in one row and total number blocks in one column.

8. The method of clause 7 wherein if the centroid around variance for the whole image is less than the an image size adaptive threshold, the processing jumps to an object of interest isolation module to conduct the block variance-based object of interest isolation; otherwise, the centroid around variance of the upper half image and lower half image are compared to an image adaptive threshold; and if any of them is less than the image adaptive threshold, processing jumps to the object of interest isolation module to conduct the block variance-based object of interest isolation; otherwise, the processing is continued to a transition map-based detection.

9. The method of clause 1 wherein the block variance-based object of interest isolation further comprises:
   a. initializing a bounding box wherein initializing includes setting a bounding box width as half of an image width plus a six block width and a bounding box height equal to the bounding box width if the image width is larger than an image height, and setting the bounding box width as half of the image height and the bounding box height equal to the bounding box width plus a twelve block width if the image width is less than or equal to the image height, using a high variance block centroid as a bounding box center to draw the bounding box, and if the bounding box is over an image boundary, the bounding box is shifted in the image such that the bounding box has a minimum 3 blocks distance from the image boundary;
   b. separating the bounding box into 8×8 sub-boxes and counting the number of high variance blocks within each sub-box;
   c. applying a sub-box selection wherein for each row of sub-boxes, if the number of candidate blocks is larger than or equal to 2, the sub-box is denoted as an object sub-box, and if the number of candidate blocks is larger than 0 and one of the left neighbor sub-boxes has more than 2 candidate blocks within, the sub-box is denoted as an object sub-box, otherwise, the sub-box is denoted as a non-object sub-box; and
   d. after the sub-box selection, generating a convex shape, for each row of sub-boxes, the leftmost object sub-box and rightmost object sub-box are found, and all of the sub-boxes between them are denoted as object sub-boxes, for each column of sub-boxes, the top object sub-box and bottom object sub-box are found, and all of the sub-boxes between them are denoted as object sub-boxes, the generated convex set is the isolated object of interest.

10. The method of clause 1 wherein transition map-based detection further comprises:
    a. extracting a block transition map, wherein the transition map is calculated by:
       i. for each 8×8 luminance (Y) block and 4×4 chorminance (CbCr) block, calculating an intensity and pseudo-color saturation value, and computing a difference with eight neighbor blocks;
       ii. finding a maximum from eight difference values, if the maximum is larger than a limit, the maximum is recorded as the transition value of the block, otherwise, zero is recorded as the transition value of the block; and
       iii. after the blocks are processed, calculating a mean value of all of the non-zero transition value, and using the mean value as a new threshold to generate the final transition map;

b. after the final transition map is generated, counting the total number of blocks with a non-zero transition value, and if this number is larger than a second limit, finding a qualified seed comprising:
  i. calculating a horizontal and vertical location centroid of the blocks with non-zero transition value;
  ii. if the distance between the centroid and any of the four image boundaries is less than or equal to a third limit, the transition map-based detection is terminated, and the detection result is negative;
  iii. checking the row of blocks in the same row as the centroid and the column of blocks in the same column as the centroid, if the centroid block has a zero transition value, and at least one side has no non-zero transition block, no qualified seed is able to be found, thus the transition map-based detection is terminated and the detection result is negative;
  iv. checking the block located in the centroid position and its four neighbor blocks, if all of them have a zero transition value, then the centroid is selected as a qualified seed and center around growing process is applied around the seed;
  v. checking the horizontally left and right 10 blocks around the centroid, if there are eight connected blocks that have a zero transition value, the highlighted block is selected as a seed, and the center around growing process is applied around the seed to find all of the zero transition blocks that are able to be linked to the seed through other zero transition blocks; and
  vi. checking the vertically upper and lower 10 blocks around the centroid, if there are eight connected blocks that have a zero transition value, the highlighted block is selected as a seed, and the center around growing process is applied around the seed to find all of the zero transition blocks that are able to be linked to the seed through other zero transition blocks; and
c. after the growing process, comparing the growing shape size to the bounding box size, if the growing shape size is less than half of the bounding box size or less than two times of summation of total number of blocks in one row and one column of the image, then no object portrait is detected, otherwise, object of interest isolation is applied, including:
  i. initializing a bounding box generated by the center around growing process; and
  ii. finding for each row of object blocks within the bounding box, the leftmost object block and rightmost object block, denoting all of the blocks between them as an object block, finding for each column of blocks, the top object block and bottom object block and denoting all of the blocks between them as object blocks.

11. The method of clause 10 wherein using the mean value as the new threshold to generate the final transition map further comprises:
a. for each block, if a transition value is larger than the new threshold, the transition value is kept;
b. for each block, if the left processed block has a non-zero transition and at least one of its right two neighbor blocks has a transition value larger than the new threshold, the transition value is stored as an original value plus one;
c. for each block, if its upper block has a transition value larger than the threshold and at least one of its lower two neighbor blocks has transition value larger than the new threshold, its transition value is stored as the original value plus one; and
d. otherwise, the transition value is stored as zero.

12. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

13. A system implemented on a device comprising:
a. a block variance-based detection module configured for determining visually stand-out blocks;
b. an object of interest isolation module operatively coupled to the block variance-based detection module, the object of interest isolation module configured for isolating an object of interest; and
c. a transition map-based detection module operatively coupled to the object of interest isolation module, the transition map-based detection module configured for determining an object portrait using a transition map.

14. The system of clause 13 wherein if the input image includes a stand-out object, the object of interest isolation module conducts the object of interest isolation.

15. The system of clause 13 wherein the transition map-based detection module is configured for:
  i. generating a transition map based on a block difference between each block with neighboring blocks;
  ii. determining if an object portrait is detected based on the transition map;
  iii. if the object portrait is detected, then conducting the transition map-based object of interest isolation; and
  iv. if the object portrait is not detected, then the input image does not contain an object of interest.

16. The system of clause 13 wherein the block variance-based detection module is further configured for selecting visually stand-out blocks by comparing each block's variance with a content adaptive threshold and if a distribution compactness of the visually stand-out blocks is compact, the image includes the stand-out object.

17. The system of clause 13 wherein the transition map-based detection module is further configured for searching to find a qualified start point to start a center around growing; if the qualified start point is not found, then the transition map-based detection module returns negative; otherwise, if a growing result is successful, the object portrait is detected.

18. The system of clause 13 wherein the block variance-based detection module is further configured for implementing:
a. an adaptive block variance extraction process to calculate an adaptive 8×8 block variance for each block;
b. if the obtained variance is larger than a threshold, the variance is kept; otherwise, the block is shifted, and a new, shifted block variance is calculated;
c. if the variance of the shifted block is larger than the threshold, the shifted block variance is used as a current block variance; otherwise, the original block variance is used;
d. after the block variances are obtained, a mean block variance value of high variance blocks is calculated;
e. if the mean variance is larger than a second threshold, the mean value is set to the second threshold, and if the block variance is larger than the mean value, the block is selected as a high variance block; and
f. the high variance blocks are analyzed if their distribution is able to satisfy a stand-out criterion check.

19. The system of clause 18 further comprising a distraction removal module configured for:
   a. extracting a location centroid of the high variance blocks;
   b. counting a number of the high variance blocks in a left ¼ width image and a right ¼ width image;
   c. if any of the high variance blocks is bigger than either half of a total number of blocks or number of blocks in one row, a horizontal centroid is checked to determine if the algorithm will skip the following block variance based detection modules and jump to transition map based detection;
   d. the location centroid of the high variance blocks in the upper half of the image is extracted if the total number of the high variance blocks in the upper half of the image is larger than a third threshold which is one fourth of the number of blocks in one row of the image; and
   e. the location centroid of the high variance blocks in the lower half of the image is extracted if the total number of high variance blocks in the lower half of the image is larger than the third threshold which is one fourth of the number of blocks in one row of the image.

20. The system of clause 19 wherein if the total number of high variance blocks in the whole image is larger than an image size adaptive threshold, the location centroid around variance is calculated for the upper half image, lower half image and the whole image.

21. The system of clause 20 wherein for the upper half image, if the image is vertical posed (height>width) and the upper horizontal centroid around variance is bigger than the upper vertical centroid around variance, the upper vertical centroid around variance is adjusted to be equal to 2 times of upper horizontal centroid around variance; and the centroid around variance of a whole image is then compared to an image adaptive threshold which is a percentage of the multiplication of total number blocks in one row and total number blocks in one column.

22. The system of clause 21 wherein if the centroid around variance for the whole image is less than the an image size adaptive threshold, the processing jumps to an object of interest isolation module to conduct the block variance-based object of interest isolation; otherwise, the centroid around variance of the upper half image and lower half image are compared to an image adaptive threshold; and if any of them is less than the image adaptive threshold, processing jumps to the object of interest isolation module to conduct the block variance-based object of interest isolation; otherwise, the processing is continued to a transition map-based detection.

23. The system of clause 13 wherein the object of interest isolation module is further configured for:
   a. initializing a bounding box wherein initializing includes setting a bounding box width as half of an image width plus a six block width and a bounding box height equal to the bounding box width if the image width is larger than an image height, and setting the bounding box width as half of the image height and the bounding box height equal to the bounding box width plus a twelve block width if the image width is less than or equal to the image height, using a high variance block centroid as a bounding box center to draw the bounding box, and if the bounding box is over an image boundary, the bounding box is shifted in the image such that the bounding box has a minimum 3 blocks distance from the image boundary;
   b. separating the bounding box into 8×8 sub-boxes and counting the number of high variance blocks within each sub-box;
   c. applying a sub-box selection wherein for each row of sub-boxes, if the number of candidate blocks is larger than or equal to 2, the sub-box is denoted as an object sub-box, and if the number of candidate blocks is larger than 0 and one of the left neighbor sub-boxes has more than 2 candidate blocks within, the sub-box is denoted as an object sub-box, otherwise, the sub-box is denoted as a non-object sub-box; and
   d. after the sub-box selection, generating a convex shape, for each row of sub-boxes, the leftmost object sub-box and rightmost object sub-box are found, and all of the sub-boxes between them are denoted as object sub-boxes, for each column of sub-boxes, the top object sub-box and bottom object sub-box are found, and all of the sub-boxes between them are denoted as object sub-boxes, the generated convex set is the isolated object of interest.

24. The system of clause 13 wherein transition map-based detection module is further configured for:
   a. extracting a block transition map, wherein the transition map is calculated by:
      i. for each 8×8 luminance (Y) block and 4×4 chorminance (CbCr) block, calculating an intensity and pseudo-color saturation value, and computing a difference with eight neighbor blocks;
      ii. finding a maximum from eight difference values, if the maximum is larger than a limit, the maximum is recorded as the transition value of the block, otherwise, zero is recorded as the transition value of the block; and
      iii. after the blocks are processed, calculating a mean value of all of the non-zero transition value, and using the mean value as a new threshold to generate the final transition map;
   b. after the final transition map is generated, counting the total number of blocks with a non-zero transition value, and if this number is larger than a second limit, finding a qualified seed comprising:
      i. calculating a horizontal and vertical location centroid of the blocks with non-zero transition value;
      ii. if the distance between the centroid and any of the four image boundaries is less than or equal to a third limit, the transition map-based detection is terminated, and the detection result is negative;
      iii. checking the row of blocks in the same row as the centroid and the column of blocks in the same column as the centroid, if the centroid block has a zero transition value, and at least one side has no non-zero transition block, no qualified seed is able to be found, thus the transition map-based detection is terminated and the detection result is negative;
      iv. checking the block located in the centroid position and its four neighbor blocks, if all of them have a zero transition value, then the centroid is selected as a qualified seed and center around growing process is applied around the seed;
      v. checking the horizontally left and right 10 blocks around the centroid, if there are eight connected blocks that have a zero transition value, the highlighted block is selected as a seed, and the center around growing process is applied around the seed to find all of the zero transition blocks that are able to be linked to the seed through other zero transition blocks; and vi. checking the vertically upper and lower 10 blocks around the centroid, if there are eight connected blocks that have a zero transition value, the highlighted block is selected as a seed, and the center around growing process is applied around the seed to find all of the zero transition blocks that are able to be linked to the seed through other zero transition blocks; and c. after the growing process, comparing the growing shape size to the bounding box size, if the growing shape size is less than half of the bounding box size or less than two times of summation of total number of blocks in one row and one column of the image, then no object portrait is detected, otherwise, object of interest isolation is applied, including:
  i. initializing a bounding box generated by the center around growing process; and
  ii. finding for each row of object blocks within the bounding box, the leftmost object block and rightmost object block, denoting all of the blocks between them as an object block, finding for each column of blocks, the top object block and bottom object block and denoting all of the blocks between them as object blocks.

25. The system of clause 24 wherein using the mean value as the new threshold to generate the final transition map further comprises:
  a. for each block, if a transition value is larger than the new threshold, the transition value is kept;
  b. for each block, if the left processed block has a non-zero transition and at least one of its right two neighbor blocks has a transition value larger than the new threshold, the transition value is stored as an original value plus one;
  c. for each block, if its upper block has a transition value larger than the threshold and at least one of its lower two neighbor blocks has transition value larger than the new threshold, its transition value is stored as the original value plus one; and
  d. otherwise, the transition value is stored as zero.

26. The system of clause 13 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

27. A device comprising:
  a. a memory for storing an application, the application configured for:
    i. processing an input image using a block variance-based detection module;
    ii. if the input image includes a stand-out object, conducting a block variance-based object of interest isolation; and
    iii. otherwise, implementing a transition map-based detection comprising:
      (1) generating a transition map based on a block difference between each block with neighboring blocks;
      (2) determining if an object portrait is detected based on the transition map;
      (3) if the object portrait is detected, then conducting the transition map-based object of interest isolation; and
      (4) if the object portrait is not detected, then the input image does not contain an object of interest; and
  b. a processing component coupled to the memory, the processing component configured for processing the application.

28. The device of clause 27 wherein processing the input image includes selecting visually stand-out blocks by comparing each block's variance with a content adaptive threshold and if a distribution compactness of the visually stand-out blocks is compact, the image includes the stand-out object.

29. The device of clause 27 further comprising searching to find a qualified start point to start a center around growing; if the qualified start point is not found, then the transition map-based detection module returns negative; otherwise, if a growing result is successful, the object portrait is detected.

30. The device of clause 27 wherein the block variance-based detection module is configured for implementing:
  a. an adaptive block variance extraction method to calculate an adaptive 8×8 block variance for each block;
  b. if the obtained variance is larger than a threshold, the variance is kept; otherwise, the block is shifted, and a new, shifted block variance is calculated;
  c. if the variance of the shifted block is larger than the threshold, the shifted block variance is used as a current block variance; otherwise, the original block variance is used;
  d. after the block variances are obtained, a mean block variance value of high variance blocks is calculated;
  e. if the mean variance is larger than a second threshold, the mean value is set to the second threshold, and if the block variance is larger than the mean value, the block is selected as a high variance block; and
  f. the high variance blocks are analyzed if their distribution is able to satisfy a stand-out criterion check.

31. The device of clause 30 further comprising using a distraction removal module configured for:
  a. extracting a location centroid of the high variance blocks;
  b. counting a number of the high variance blocks in a left ¼ width image and a right ¼ width image;
  c. if any of the high variance blocks is bigger than either half of a total number of blocks or number of blocks in one row, a horizontal centroid is checked to determine if the algorithm will skip the following block variance based detection modules and jump to transition map based detection;
  d. the location centroid of the high variance blocks in the upper half of the image is extracted if the total number of the high variance blocks in the upper half of the image is larger than a third threshold which is one fourth of the number of blocks in one row of the image; and
  e. the location centroid of the high variance blocks in the lower half of the image is extracted if the total number of high variance blocks in the lower half of the image is larger than the third threshold which is one fourth of the number of blocks in one row of the image.

32. The device of clause 31 wherein if the total number of high variance blocks in the whole image is larger than an image size adaptive threshold, the location centroid around variance is calculated for the upper half image, lower half image and the whole image.

33. The device of clause 32 wherein for the upper half image, if the image is vertical posed (height>width) and the upper horizontal centroid around variance is bigger than the upper vertical centroid around variance, the upper vertical centroid around variance is adjusted to be equal to 2 times of upper horizontal centroid around variance; and the centroid around variance of a whole image is then compared to an image adaptive threshold which is a percentage of the multiplication of total number blocks in one row and total number blocks in one column.

34. The device of clause 33 wherein if the centroid around variance for the whole image is less than the image size adaptive threshold, the processing jumps to an object of interest isolation module to conduct the block variance-based object of interest isolation; otherwise, the centroid around variance of the upper half image and lower half image are compared to an image adaptive threshold; and if any of them is less than the image adaptive threshold, processing jumps to the object of interest isolation module to conduct the block variance-based object of interest isolation; otherwise, the processing is continued to a transition map-based detection.

35. The device of clause 27 wherein the block variance-based object of interest isolation further comprises:
   a. initializing a bounding box wherein initializing includes setting a bounding box width as half of an image width plus a six block width and a bounding box height equal to the bounding box width if the image width is larger than an image height, and setting the bounding box width as half of the image height and the bounding box height equal to the bounding box width plus a twelve block width if the image width is less than or equal to the image height, using a high variance block centroid as a bounding box center to draw the bounding box, and if the bounding box is over an image boundary, the bounding box is shifted in the image such that the bounding box has a minimum 3 blocks distance from the image boundary;
   b. separating the bounding box into 8×8 sub-boxes and counting the number of high variance blocks within each sub-box;
   c. applying a sub-box selection wherein for each row of sub-boxes, if the number of candidate blocks is larger than or equal to 2, the sub-box is denoted as an object sub-box, and if the number of candidate blocks is larger than 0 and one of the left neighbor sub-boxes has more than 2 candidate blocks within, the sub-box is denoted as an object sub-box, otherwise, the sub-box is denoted as a non-object sub-box; and
   d. after the sub-box selection, generating a convex shape, for each row of sub-boxes, the leftmost object sub-box and rightmost object sub-box are found, and all of the sub-boxes between them are denoted as object sub-boxes, for each column of sub-boxes, the top object sub-box and bottom object sub-box are found, and all of the sub-boxes between them are denoted as object sub-boxes, the generated convex set is the isolated object of interest.

36. The device of clause 27 wherein transition map-based detection further comprises:
   a. extracting a block transition map, wherein the transition map is calculated by:
      i. for each 8×8 luminance (Y) block and 4×4 chorminance (CbCr) block, calculating an intensity and pseudo-color saturation value, and computing a difference with eight neighbor blocks;
      ii. finding a maximum from eight difference values, if the maximum is larger than a limit, the maximum is recorded as the transition value of the block, otherwise, zero is recorded as the transition value of the block; and
      iii. after the blocks are processed, calculating a mean value of all of the non-zero transition value, and using the mean value as a new threshold to generate the final transition map;
   b. after the final transition map is generated, counting the total number of blocks with a non-zero transition value, and if this number is larger than a second limit, finding a qualified seed comprising:
      i. calculating a horizontal and vertical location centroid of the blocks with non-zero transition value;
      ii. if the distance between the centroid and any of the four image boundaries is less than or equal to a third limit, the transition map-based detection is terminated, and the detection result is negative;
      iii. checking the row of blocks in the same row as the centroid and the column of blocks in the same column as the centroid, if the centroid block has a zero transition value, and at least one side has no non-zero transition block, no qualified seed is able to be found, thus the transition map-based detection is terminated and the detection result is negative;
      iv. checking the block located in the centroid position and its four neighbor blocks, if all of them have a zero transition value, then the centroid is selected as a qualified seed and center around growing process is applied around the seed;
      v. checking the horizontally left and right 10 blocks around the centroid, if there are eight connected blocks that have a zero transition value, the highlighted block is selected as a seed, and the center around growing process is applied around the seed to find all of the zero transition blocks that are able to be linked to the seed through other zero transition blocks; and
      vi. checking the vertically upper and lower 10 blocks around the centroid, if there are eight connected blocks that have a zero transition value, the highlighted block is selected as a seed, and the center around growing process is applied around the seed to find all of the zero transition blocks that are able to be linked to the seed through other zero transition blocks; and
   c. after the growing process, comparing the growing shape size to the bounding box size, if the growing shape size is less than half of the bounding box size or less than two times of summation of total number of blocks in one row and one column of the image, then no object portrait is detected, otherwise, object of interest isolation is applied, including:
      i. initializing a bounding box generated by the center around growing process; and
      ii. finding for each row of object blocks within the bounding box, the leftmost object block and rightmost object block, denoting all of the blocks between them as an object block, finding for each column of blocks, the top object block and bottom object block and denoting all of the blocks between them as object blocks.

37. The device of clause 36 wherein using the mean value as the new threshold to generate the final transition map further comprises:
   a. for each block, if a transition value is larger than the new threshold, the transition value is kept;
   b. for each block, if the left processed block has a non-zero transition and at least one of its right two neighbor blocks has a transition value larger than the new threshold, the transition value is stored as an original value plus one;
c. for each block, if its upper block has a transition value larger than the threshold and at least one of its lower two neighbor blocks has transition value larger than the new threshold, its transition value is stored as the original value plus one; and
d. otherwise, the transition value is stored as zero.

38. The device of clause 27 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

39. A camera comprising:
   a. a lens;
   b. a sensor configured for acquiring an input image through the lens;
   c. a memory for storing an application, the application configured for:
      i. processing the input image using a block variance-based detection module;
      ii. if the input image includes a stand-out object, conducting a block variance-based object of interest isolation; and
      iii. otherwise, implementing a transition map-based detection comprising:
         (1) generating a transition map based on a block difference between each block with neighboring blocks;
         (2) determining if an object portrait is detected based on the transition map;
         (3) if the object portrait is detected, then conducting the transition map-based object of interest isolation; and
         (4) if the object portrait is not detected, then the input image does not contain an object of interest; and
   d. a processing component coupled to the memory, the processing component configured for processing the application.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method implemented on a device comprising:
   a. processing an input image using a block variance-based detection module;
   b. if the input image includes a stand-out object, conducting a block variance-based object of interest isolation; and
   c. otherwise, implementing a transition map-based detection comprising:
      i. generating a transition map based on a block difference between each block with neighboring blocks;
      ii. determining if an object portrait is detected based on the transition map;
      iii. if the object portrait is detected, then conducting the transition map-based object of interest isolation; and
      iv. if the object portrait is not detected, then the input image does not contain an object of interest.

2. The method of claim 1 wherein processing the input image includes selecting visually stand-out blocks by comparing each block's variance with a content adaptive threshold and if a distribution compactness of the visually stand-out blocks is compact, the image includes the stand-out object.

3. The method of claim 1 further comprising searching to find a qualified start point to start a center around growing; if the qualified start point is not found, then the transition map-based detection module returns negative; otherwise, if a growing result is successful, the object portrait is detected.

4. The method of claim 1 wherein the block variance-based detection module is configured for implementing:
   a. an adaptive block variance extraction method to calculate an adaptive 8×8 block variance for each block;
   b. if the obtained variance is larger than a threshold, the variance is kept; otherwise, the block is shifted, and a new, shifted block variance is calculated;
   c. if the variance of the shifted block is larger than the threshold, the shifted block variance is used as a current block variance; otherwise, the original block variance is used;
   d. after the block variances are obtained, a mean block variance value of high variance blocks is calculated;
   e. if the mean variance is larger than a second threshold, the mean value is set to the second threshold, and if the block variance is larger than the mean value, the block is selected as a high variance block; and
   f. the high variance blocks are analyzed if their distribution is able to satisfy a stand-out criterion check.

5. The method of claim 4 further comprising using a distraction removal module configured for:
   a. extracting a location centroid of the high variance blocks;
   b. counting a number of the high variance blocks in a left ¼ width image and a right ¼ width image;
   c. if any of the high variance blocks is bigger than either half of a total number of blocks or number of blocks in one row, a horizontal centroid is checked to determine if the algorithm will skip the following block variance based detection modules and jump to transition map based detection;
   d. the location centroid of the high variance blocks in the upper half of the image is extracted if the total number of the high variance blocks in the upper half of the image is larger than a third threshold which is one fourth of the number of blocks in one row of the image; and
   e. the location centroid of the high variance blocks in the lower half of the image is extracted if the total number of high variance blocks in the lower half of the image is larger than the third threshold which is one fourth of the number of blocks in one row of the image.

6. The method of claim 5 wherein if the total number of high variance blocks in the whole image is larger than an image size adaptive threshold, the location centroid around variance is calculated for the upper half image, lower half image and the whole image.

7. The method of claim 6 wherein for the upper half image, if the image is vertical posed (height>width) and the upper horizontal centroid around variance is bigger than the upper vertical centroid around variance, the upper vertical centroid around variance is adjusted to be equal to 2 times of upper horizontal centroid around variance; and the centroid around variance of a whole image is then compared to an image adaptive threshold which is a percentage of the multiplication of total number blocks in one row and total number blocks in one column.

8. The method of claim 7 wherein if the centroid around variance for the whole image is less than the image size adaptive threshold, the processing jumps to an object of interest isolation module to conduct the block variance-based object of interest isolation; otherwise, the centroid around variance of the upper half image and lower half image are compared to an image adaptive threshold; and if any of them is less than the image adaptive threshold, processing jumps to the object of interest isolation module to conduct the block variance-based object of interest isolation; otherwise, the processing is continued to a transition map-based detection.

9. The method of claim 1 wherein the block variance-based object of interest isolation further comprises:
   a. initializing a bounding box wherein initializing includes setting a bounding box width as half of an image width plus a six block width and a bounding box height equal to the bounding box width if the image width is larger than an image height, and setting the bounding box width as half of the image height and the bounding box height equal to the bounding box width plus a twelve block width if the image width is less than or equal to the image height, using a high variance block centroid as a bounding box center to draw the bounding box, and if the bounding box is over an image boundary, the bounding box is shifted in the image such that the bounding box has a minimum 3 blocks distance from the image boundary;
   b. separating the bounding box into 8×8 sub-boxes and counting the number of high variance blocks within each sub-box;
   c. applying a sub-box selection wherein for each row of sub-boxes, if the number of candidate blocks is larger than or equal to 2, the sub-box is denoted as an object sub-box, and if the number of candidate blocks is larger than 0 and one of the left neighbor sub-boxes has more than 2 candidate blocks within, the sub-box is denoted as an object sub-box, otherwise, the sub-box is denoted as a non-object sub-box; and
   d. after the sub-box selection, generating a convex shape, for each row of sub-boxes, the leftmost object sub-box and rightmost object sub-box are found, and all of the sub-boxes between them are denoted as object sub-boxes, for each column of sub-boxes, the top object sub-box and bottom object sub-box are found, and all of the sub-boxes between them are denoted as object sub-boxes, the generated convex set is the isolated object of interest.

10. The method of claim 1 wherein transition map-based detection further comprises:
    a. extracting a block transition map, wherein the transition map is calculated by:
       i. for each 8×8 luminance (Y) block and 4×4 chorminance (CbCr) block, calculating an intensity and pseudo-color saturation value, and computing a difference with eight neighbor blocks;
       ii. finding a maximum from eight difference values, if the maximum is larger than a limit, the maximum is recorded as the transition value of the block, otherwise, zero is recorded as the transition value of the block; and
       iii. after the blocks are processed, calculating a mean value of all of the non-zero transition value, and using the mean value as a new threshold to generate the final transition map;
    b. after the final transition map is generated, counting the total number of blocks with a non-zero transition value, and if this number is larger than a second limit, finding a qualified seed comprising:
       i. calculating a horizontal and vertical location centroid of the blocks with non-zero transition value;
       ii. if the distance between the centroid and any of the four image boundaries is less than or equal to a third limit, the transition map-based detection is terminated, and the detection result is negative;
       iii. checking the row of blocks in the same row as the centroid and the column of blocks in the same column as the centroid, if the centroid block has a zero transition value, and at least one side has no non-zero transition block, no qualified seed is able to be found, thus the transition map-based detection is terminated and the detection result is negative;
       iv. checking the block located in the centroid position and its four neighbor blocks, if all of them have a zero transition value, then the centroid is selected as a qualified seed and center around growing process is applied around the seed;
       v. checking the horizontally left and right 10 blocks around the centroid, if there are eight connected blocks that have a zero transition value, the highlighted block is selected as a seed, and the center around growing process is applied around the seed to find all of the zero transition blocks that are able to be linked to the seed through other zero transition blocks; and
       vi. checking the vertically upper and lower 10 blocks around the centroid, if there are eight connected blocks that have a zero transition value, the highlighted block is selected as a seed, and the center around growing process is applied around the seed to find all of the zero transition blocks that are able to be linked to the seed through other zero transition blocks; and
    c. after the growing process, comparing the growing shape size to the bounding box size, if the growing shape size is less than half of the bounding box size or less than two times of summation of total number of blocks in one row and one column of the image, then no object portrait is detected, otherwise, object of interest isolation is applied, including:
       i. initializing a bounding box generated by the center around growing process; and
       ii. finding for each row of object blocks within the bounding box, the leftmost object block and rightmost object block, denoting all of the blocks between them as an object block, finding for each column of blocks, the top object block and bottom object block and denoting all of the blocks between them as object blocks.

11. The method of claim 10 wherein using the mean value as the new threshold to generate the final transition map further comprises:
    a. for each block, if a transition value is larger than the new threshold, the transition value is kept;
    b. for each block, if the left processed block has a non-zero transition and at least one of its right two neighbor blocks has a transition value larger than the new threshold, the transition value is stored as an original value plus one;
    c. for each block, if its upper block has a transition value larger than the threshold and at least one of its lower two neighbor blocks has transition value larger than the new threshold, its transition value is stored as the original value plus one; and d. otherwise, the transition value is stored as zero.

12. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a video player, a DVD writer/player, a television and a home entertainment system.

13. A system implemented on a device comprising:
   a. a block variance-based detection module configured for determining visually stand-out blocks;
   b. an object of interest isolation module operatively coupled to the block variance-based detection module, the object of interest isolation module configured for isolating an object of interest; and
   c. a transition map-based detection module operatively coupled to the object of interest isolation module, the transition map-based detection module configured for determining an object portrait using a transition map.

14. The system of claim 13 wherein if the input image includes a stand-out object, the object of interest isolation module conducts the object of interest isolation.

15. The system of claim 13 wherein the transition map-based detection module is configured for:
   i. generating a transition map based on a block difference between each block with neighboring blocks;
   ii. determining if an object portrait is detected based on the transition map;
   iii. if the object portrait is detected, then conducting the transition map-based object of interest isolation; and
   iv. if the object portrait is not detected, then the input image does not contain an object of interest.

16. The system of claim 13 wherein the block variance-based detection module is further configured for selecting visually stand-out blocks by comparing each block's variance with a content adaptive threshold and if a distribution compactness of the visually stand-out blocks is compact, the image includes the stand-out object.

17. The system of claim 13 wherein the transition map-based detection module is further configured for searching to find a qualified start point to start a center around growing; if the qualified start point is not found, then the transition map-based detection module returns negative; otherwise, if a growing result is successful, the object portrait is detected.

18. The system of claim 13 wherein the block variance-based detection module is further configured for implementing:
   a. an adaptive block variance extraction process to calculate an adaptive 8×8 block variance for each block;
   b. if the obtained variance is larger than a threshold, the variance is kept; otherwise, the block is shifted, and a new, shifted block variance is calculated;
   c. if the variance of the shifted block is larger than the threshold, the shifted block variance is used as a current block variance; otherwise, the original block variance is used;
   d. after the block variances are obtained, a mean block variance value of high variance blocks is calculated;
   e. if the mean variance is larger than a second threshold, the mean value is set to the second threshold, and if the block variance is larger than the mean value, the block is selected as a high variance block; and
   f. the high variance blocks are analyzed if their distribution is able to satisfy a stand-out criterion check.

19. The system of claim 18 further comprising a distraction removal module configured for:
   a. extracting a location centroid of the high variance blocks;
   b. counting a number of the high variance blocks in a left ¼ width image and a right ¼ width image;
   c. if any of the high variance blocks is bigger than either half of a total number of blocks or number of blocks in one row, a horizontal centroid is checked to determine if the algorithm will skip the following block variance based detection modules and jump to transition map based detection;
   d. the location centroid of the high variance blocks in the upper half of the image is extracted if the total number of the high variance blocks in the upper half of the image is larger than a third threshold which is one fourth of the number of blocks in one row of the image; and
   e. the location centroid of the high variance blocks in the lower half of the image is extracted if the total number of high variance blocks in the lower half of the image is larger than the third threshold which is one fourth of the number of blocks in one row of the image.

20. The system of claim 19 wherein if the total number of high variance blocks in the whole image is larger than an image size adaptive threshold, the location centroid around variance is calculated for the upper half image, lower half image and the whole image.

21. The system of claim 20 wherein for the upper half image, if the image is vertical posed (height>width) and the upper horizontal centroid around variance is bigger than the upper vertical centroid around variance, the upper vertical centroid around variance is adjusted to be equal to 2 times of upper horizontal centroid around variance; and the centroid around variance of a whole image is then compared to an image adaptive threshold which is a percentage of the multiplication of total number blocks in one row and total number blocks in one column.

22. The system of claim 21 wherein if the centroid around variance for the whole image is less than the image size adaptive threshold, the processing jumps to an object of interest isolation module to conduct the block variance-based object of interest isolation; otherwise, the centroid around variance of the upper half image and lower half image are compared to an image adaptive threshold; and if any of them is less than the image adaptive threshold, processing jumps to the object of interest isolation module to conduct the block variance-based object of interest isolation; otherwise, the processing is continued to a transition map-based detection.

23. The system of claim 13 wherein the object of interest isolation module is further configured for:
   a. initializing a bounding box wherein initializing includes setting a bounding box width as half of an image width plus a six block width and a bounding box height equal to the bounding box width if the image width is larger than an image height, and setting the bounding box width as half of the image height and the bounding box height equal to the bounding box width plus a twelve block width if the image width is less than or equal to the image height, using a high variance block centroid as a bounding box center to draw the bounding box, and if the bounding box is over an image boundary, the bounding box is shifted in the image such that the bounding box has a minimum 3 blocks distance from the image boundary;

b. separating the bounding box into 8×8 sub-boxes and counting the number of high variance blocks within each sub-box;
c. applying a sub-box selection wherein for each row of sub-boxes, if the number of candidate blocks is larger than or equal to 2, the sub-box is denoted as an object sub-box, and if the number of candidate blocks is larger than 0 and one of the left neighbor sub-boxes has more than 2 candidate blocks within, the sub-box is denoted as an object sub-box, otherwise, the sub-box is denoted as a non-object sub-box; and
d. after the sub-box selection, generating a convex shape, for each row of sub-boxes, the leftmost object sub-box and rightmost object sub-box are found, and all of the sub-boxes between them are denoted as object sub-boxes, for each column of sub-boxes, the top object sub-box and bottom object sub-box are found, and all of the sub-boxes between them are denoted as object sub-boxes, the generated convex set is the isolated object of interest.

24. The system of claim 13 wherein transition map-based detection module is further configured for:
   a. extracting a block transition map, wherein the transition map is calculated by:
      i. for each 8×8 luminance (Y) block and 4×4 chorminance (CbCr) block, calculating an intensity and pseudo-color saturation value, and computing a difference with eight neighbor blocks;
      ii. finding a maximum from eight difference values, if the maximum is larger than a limit, the maximum is recorded as the transition value of the block, otherwise, zero is recorded as the transition value of the block; and
      iii. after the blocks are processed, calculating a mean value of all of the non-zero transition value, and using the mean value as a new threshold to generate the final transition map;
   b. after the final transition map is generated, counting the total number of blocks with a non-zero transition value, and if this number is larger than a second limit, finding a qualified seed comprising:
      i. calculating a horizontal and vertical location centroid of the blocks with non-zero transition value;
      ii. if the distance between the centroid and any of the four image boundaries is less than or equal to a third limit, the transition map-based detection is terminated, and the detection result is negative;
      iii. checking the row of blocks in the same row as the centroid and the column of blocks in the same column as the centroid, if the centroid block has a zero transition value, and at least one side has no non-zero transition block, no qualified seed is able to be found, thus the transition map-based detection is terminated and the detection result is negative;
      iv. checking the block located in the centroid position and its four neighbor blocks, if all of them have a zero transition value, then the centroid is selected as a qualified seed and center around growing process is applied around the seed;
      v. checking the horizontally left and right 10 blocks around the centroid, if there are eight connected blocks that have a zero transition value, the highlighted block is selected as a seed, and the center around growing process is applied around the seed to find all of the zero transition blocks that are able to be linked to the seed through other zero transition blocks; and
      vi. checking the vertically upper and lower 10 blocks around the centroid, if there are eight connected blocks that have a zero transition value, the highlighted block is selected as a seed, and the center around growing process is applied around the seed to find all of the zero transition blocks that are able to be linked to the seed through other zero transition blocks; and
   c. after the growing process, comparing the growing shape size to the bounding box size, if the growing shape size is less than half of the bounding box size or less than two times of summation of total number of blocks in one row and one column of the image, then no object portrait is detected, otherwise, object of interest isolation is applied, including:
      i. initializing a bounding box generated by the center around growing process; and
      ii. finding for each row of object blocks within the bounding box, the leftmost object block and rightmost object block, denoting all of the blocks between them as an object block, finding for each column of blocks, the top object block and bottom object block and denoting all of the blocks between them as object blocks.

25. The system of claim 24 wherein using the mean value as the new threshold to generate the final transition map further comprises:
   a. for each block, if a transition value is larger than the new threshold, the transition value is kept;
   b. for each block, if the left processed block has a non-zero transition and at least one of its right two neighbor blocks has a transition value larger than the new threshold, the transition value is stored as an original value plus one;
   c. for each block, if its upper block has a transition value larger than the threshold and at least one of its lower two neighbor blocks has transition value larger than the new threshold, its transition value is stored as the original value plus one; and
   d. otherwise, the transition value is stored as zero.

26. The system of claim 13 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a video player, a DVD writer/player, a television and a home entertainment system.

27. A device comprising:
   a. a memory for storing an application, the application configured for:
      i. processing an input image using a block variance-based detection module;
      ii. if the input image includes a stand-out object, conducting a block variance-based object of interest isolation; and
      iii. otherwise, implementing a transition map-based detection comprising:
         (1) generating a transition map based on a block difference between each block with neighboring blocks;
         (2) determining if an object portrait is detected based on the transition map;
         (3) if the object portrait is detected, then conducting the transition map-based object of interest isolation; and (4) if the object portrait is not detected, then the input image does not contain an object of interest; and b. a processing component coupled to the memory, the processing component configured for processing the application.

28. The device of claim 27 wherein processing the input image includes selecting visually stand-out blocks by comparing each block's variance with a content adaptive threshold and if a distribution compactness of the visually stand-out blocks is compact, the image includes the stand-out object.

29. The device of claim 27 further comprising searching to find a qualified start point to start a center around growing; if the qualified start point is not found, then the transition map-based detection module returns negative; otherwise, if a growing result is successful, the object portrait is detected.

30. The device of claim 27 wherein the block variance-based detection module is configured for implementing:
  a. an adaptive block variance extraction method to calculate an adaptive 8×8 block variance for each block;
  b. if the obtained variance is larger than a threshold, the variance is kept; otherwise, the block is shifted, and a new, shifted block variance is calculated;
  c. if the variance of the shifted block is larger than the threshold, the shifted block variance is used as a current block variance; otherwise, the original block variance is used;
  d. after the block variances are obtained, a mean block variance value of high variance blocks is calculated;
  e. if the mean variance is larger than a second threshold, the mean value is set to the second threshold, and if the block variance is larger than the mean value, the block is selected as a high variance block; and
  f. the high variance blocks are analyzed if their distribution is able to satisfy a stand-out criterion check.

31. The device of claim 30 further comprising using a distraction removal module configured for:
  a. extracting a location centroid of the high variance blocks;
  b. counting a number of the high variance blocks in a left ¼ width image and a right ¼ width image;
  c. if any of the high variance blocks is bigger than either half of a total number of blocks or number of blocks in one row, a horizontal centroid is checked to determine if the algorithm will skip the following block variance based detection modules and jump to transition map based detection;
  d. the location centroid of the high variance blocks in the upper half of the image is extracted if the total number of the high variance blocks in the upper half of the image is larger than a third threshold which is one fourth of the number of blocks in one row of the image; and
  e. the location centroid of the high variance blocks in the lower half of the image is extracted if the total number of high variance blocks in the lower half of the image is larger than the third threshold which is one fourth of the number of blocks in one row of the image.

32. The device of claim 31 wherein if the total number of high variance blocks in the whole image is larger than an image size adaptive threshold, the location centroid around variance is calculated for the upper half image, lower half image and the whole image.

33. The device of claim 32 wherein for the upper half image, if the image is vertical posed (height>width) and the upper horizontal centroid around variance is bigger than the upper vertical centroid around variance, the upper vertical centroid around variance is adjusted to be equal to 2 times of upper horizontal centroid around variance; and the centroid around variance of a whole image is then compared to an image adaptive threshold which is a percentage of the multiplication of total number blocks in one row and total number blocks in one column.

34. The device of claim 33 wherein if the centroid around variance for the whole image is less than the image size adaptive threshold, the processing jumps to an object of interest isolation module to conduct the block variance-based object of interest isolation; otherwise, the centroid around variance of the upper half image and lower half image are compared to an image adaptive threshold; and if any of them is less than the image adaptive threshold, processing jumps to the object of interest isolation module to conduct the block variance-based object of interest isolation; otherwise, the processing is continued to a transition map-based detection.

35. The device of claim 27 wherein the block variance-based object of interest isolation further comprises:
  a. initializing a bounding box wherein initializing includes setting a bounding box width as half of an image width plus a six block width and a bounding box height equal to the bounding box width if the image width is larger than an image height, and setting the bounding box width as half of the image height and the bounding box height equal to the bounding box width plus a twelve block width if the image width is less than or equal to the image height, using a high variance block centroid as a bounding box center to draw the bounding box, and if the bounding box is over an image boundary, the bounding box is shifted in the image such that the bounding box has a minimum 3 blocks distance from the image boundary;
  b. separating the bounding box into 8×8 sub-boxes and counting the number of high variance blocks within each sub-box;
  c. applying a sub-box selection wherein for each row of sub-boxes, if the number of candidate blocks is larger than or equal to 2, the sub-box is denoted as an object sub-box, and if the number of candidate blocks is larger than 0 and one of the left neighbor sub-boxes has more than 2 candidate blocks within, the sub-box is denoted as an object sub-box, otherwise, the sub-box is denoted as a non-object sub-box; and
  d. after the sub-box selection, generating a convex shape, for each row of sub-boxes, the leftmost object sub-box and rightmost object sub-box are found, and all of the sub-boxes between them are denoted as object sub-boxes, for each column of sub-boxes, the top object sub-box and bottom object sub-box are found, and all of the sub-boxes between them are denoted as object sub-boxes, the generated convex set is the isolated object of interest.

36. The device of claim 27 wherein transition map-based detection further comprises:
  a. extracting a block transition map, wherein the transition map is calculated by:
    i. for each 8×8 luminance (Y) block and 4×4 chorminance (CbCr) block, calculating an intensity and pseudo-color saturation value, and computing a difference with eight neighbor blocks;
    ii. finding a maximum from eight difference values, if the maximum is larger than a limit, the maximum is recorded as the transition value of the block, otherwise, zero is recorded as the transition value of the block; and iii. after the blocks are processed, calculating a mean value of all of the non-zero transition value, and using the mean value as a new threshold to generate the final transition map;
b. after the final transition map is generated, counting the total number of blocks with a non-zero transition value, and if this number is larger than a second limit, finding a qualified seed comprising:
   i. calculating a horizontal and vertical location centroid of the blocks with non-zero transition value;
   ii. if the distance between the centroid and any of the four image boundaries is less than or equal to a third limit, the transition map-based detection is terminated, and the detection result is negative;
   iii. checking the row of blocks in the same row as the centroid and the column of blocks in the same column as the centroid, if the centroid block has a zero transition value, and at least one side has no non-zero transition block, no qualified seed is able to be found, thus the transition map-based detection is terminated and the detection result is negative;
   iv. checking the block located in the centroid position and its four neighbor blocks, if all of them have a zero transition value, then the centroid is selected as a qualified seed and center around growing process is applied around the seed;
   v. checking the horizontally left and right 10 blocks around the centroid, if there are eight connected blocks that have a zero transition value, the highlighted block is selected as a seed, and the center around growing process is applied around the seed to find all of the zero transition blocks that are able to be linked to the seed through other zero transition blocks; and
   vi. checking the vertically upper and lower 10 blocks around the centroid, if there are eight connected blocks that have a zero transition value, the highlighted block is selected as a seed, and the center around growing process is applied around the seed to find all of the zero transition blocks that are able to be linked to the seed through other zero transition blocks; and
c. after the growing process, comparing the growing shape size to the bounding box size, if the growing shape size is less than half of the bounding box size or less than two times of summation of total number of blocks in one row and one column of the image, then no object portrait is detected, otherwise, object of interest isolation is applied, including:
   i. initializing a bounding box generated by the center around growing process; and
   ii. finding for each row of object blocks within the bounding box, the leftmost object block and rightmost object block, denoting all of the blocks between them as an object block, finding for each column of blocks, the top object block and bottom object block and denoting all of the blocks between them as object blocks.

37. The device of claim 36 wherein using the mean value as the new threshold to generate the final transition map further comprises:
    a. for each block, if a transition value is larger than the new threshold, the transition value is kept;
    b. for each block, if the left processed block has a non-zero transition and at least one of its right two neighbor blocks has a transition value larger than the new threshold, the transition value is stored as an original value plus one;
    c. for each block, if its upper block has a transition value larger than the threshold and at least one of its lower two neighbor blocks has transition value larger than the new threshold, its transition value is stored as the original value plus one; and
    d. otherwise, the transition value is stored as zero.

38. The device of claim 27 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a video player, a DVD writer/player, a television and a home entertainment system.

39. A camera comprising:
    a. a lens;
    b. a sensor configured for acquiring an input image through the lens;
    c. a memory for storing an application, the application configured for:
       i. processing the input image using a block variance-based detection module;
       ii. if the input image includes a stand-out object, conducting a block variance-based object of interest isolation; and
       iii. otherwise, implementing a transition map-based detection comprising:
          (1) generating a transition map based on a block difference between each block with neighboring blocks;
          (2) determining if an object portrait is detected based on the transition map;
          (3) if the object portrait is detected, then conducting the transition map-based object of interest isolation; and
          (4) if the object portrait is not detected, then the input image does not contain an object of interest; and
    d. a processing component coupled to the memory, the processing component configured for processing the application.

* * * * *